United States Patent
Lee et al.

(10) Patent No.: US 9,882,862 B2
(45) Date of Patent: Jan. 30, 2018

(54) TECHNIQUES FOR COORDINATING A MESSAGING EXPERIENCE ACROSS PLATFORMS

(71) Applicant: Facebook, Inc., Menlo Park, CA (US)

(72) Inventors: Jessica Lee, Menlo Park, CA (US); Robert Franklin Daniel, Redwood City, CA (US); William Arthur Franklin, San Francisco, CA (US); Harrison C. Wong, East Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 243 days.

(21) Appl. No.: 14/701,867

(22) Filed: May 1, 2015

(65) Prior Publication Data

US 2016/0323231 A1    Nov. 3, 2016

(51) Int. Cl.
  *G06F 15/16*  (2006.01)
  *H04L 12/58*  (2006.01)
  *H04L 29/08*  (2006.01)
(52) U.S. Cl.
  CPC .............. *H04L 51/32* (2013.01); *H04L 67/02* (2013.01)
(58) Field of Classification Search
  CPC .................................. H04L 51/32; H04L 67/02
  See application file for complete search history.

(56) References Cited

U.S. PATENT DOCUMENTS

| 6,609,198 B1* | 8/2003 | Wood | G06F 21/31 713/155 |
| 2007/0101440 A1* | 5/2007 | Bhatia | G06F 21/552 726/28 |
| 2012/0278854 A1* | 11/2012 | Ton | H04L 63/0815 726/3 |
| 2014/0041055 A1* | 2/2014 | Shaffer | G06Q 10/10 726/28 |
| 2015/0142982 A1* | 5/2015 | Gonzales | H04L 65/1069 709/227 |

\* cited by examiner

*Primary Examiner* — John B Walsh

(57) ABSTRACT

Techniques for coordinating a message experience across platforms are described. In one embodiment, an apparatus may comprise a messaging application operative on a processor circuit to receive a request from a remote web browser to login to the messaging application. The messaging application may comprise an access code generator to generate a first access code and present the first access code on a messaging application website; an authenticator to receive a second access code from a second device associated with a user identifier, compare the second and first access codes, and lookup an account associated with the user identifier; and a messaging component to retrieve message data for an account associated with the user identifier in response the second access code matching the first access code, and to transmit the message data to the remote web browser for presentation. Other embodiments are described and claimed.

21 Claims, 15 Drawing Sheets

TECHNIQUES FOR COORDINATING A MESSAGING EXPERIENCE ACROSS PLATFORMS

BACKGROUND

Users of social networking services and messaging services may have multiple ways to access and use these services, for example, via a website and via an application executing on a mobile device. Coordinating the message experience across devices and platforms, however, may be challenging. Users expect to see all of their messages and related data regardless of how they connect to their messaging service, while also expecting an easy and secure way to access their message data.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for providing a coordinated messaging experience across platforms. Some embodiments are particularly directed to techniques for accessing messages and message data from multiple platforms and sign-on methods. In one embodiment, for example, a method may comprise receiving a request to load a web page at a messaging service website from a web browser executing on a client device, where the request includes a first session identifier for an open session between the web browser and a social network service for a user of the social network service. The method may further comprise sending a second request to a server of the social network service for user information associated with the first session identifier; receiving the user information from the server of the social network service; and rendering a login graphical user interface (UI) dialog, on the web page, the dialog comprising the user information and a selectable login UI element. The method may further comprise receiving a control directive on the selectable login UI element; requesting message data associated with the user from a messaging service in response to receiving the control directive; receiving the requested message data; and transmitting the message data to the client device for presentation on the web browser. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
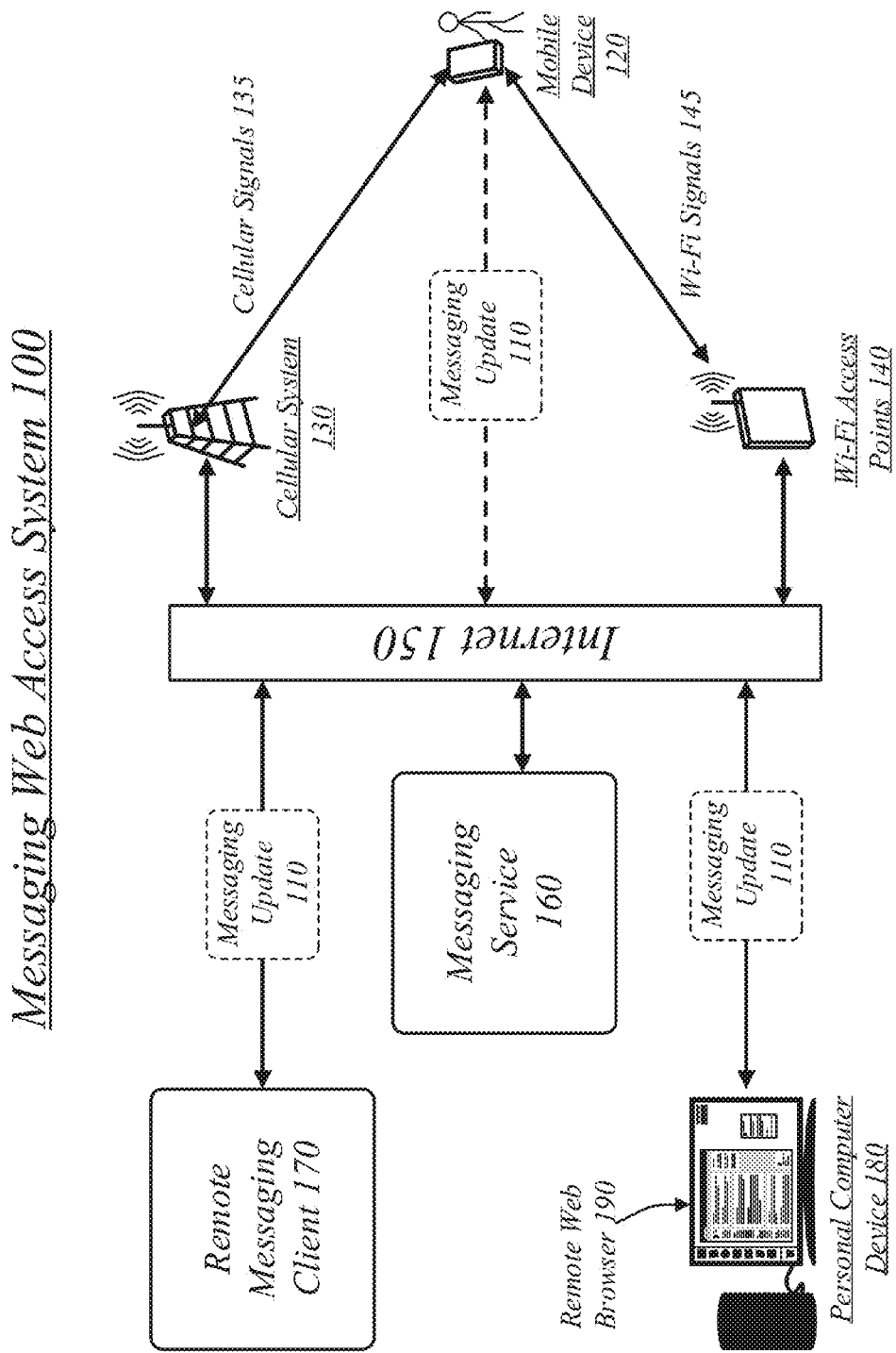
FIG. 1 illustrates an embodiment of a messaging web access system.

Various embodiments are directed to providing multiple access points to a messaging service while also providing a coordinated messaging experience across the access points. A messaging application and a messaging website may empower a user to communicate with other users by sending and receiving messages as part of a messaging service. In some embodiments, the messaging service may be provided within another service such as a social networking service, as well as being available independently of the social networking service.

Some users of both the messaging service and the social networking service may wish to remain in communication with their contacts even when one or more access platforms are unavailable. For example, some work environments do not allow their employees to access social networks from company computers, and others may not permit the use of mobile devices in some environments. Regardless, a user may wish to be accessible to their contacts by messages immediately. At the same time, the user might not wish to use simple message service (SMS) or multimedia message service (MMS) messaging services provided by a cellular service provider for cost or for other reasons. Being able to switch easily from messaging on a mobile device, to a social network website, to a messaging service website and back again without losing message data and continuity is therefore a desirable feature.

Users of a messaging service may wish to access the messaging service at times from within a social network website that also provides messaging capability. At other times, the users may wish to access the messaging service through a different website than the social network website. At still other times, the users may wish to use an application on a mobile device to access the messaging service. In some cases, the users of the messaging service may not be users of the social network site and may still need a way to access their messages through both a website and from a mobile device application. Accordingly, various embodiments provide a way for a user to access the messaging service from a variety of platforms without losing message continuity.

In order to provide the coordinated seamless transition from one messaging endpoint to another, a messaging service may need to identify and authenticate the user that is attempting to access the messaging service. In some embodiments, when the user of the messaging service is also a user of a social network service (SNS), the messaging service may use the user's SNS information to access the message information for the user.

In some embodiments, the user may not be a user of the SNS. In such cases, the user may attempt to access the messaging service through a messaging service website, using, for example, a phone number of their mobile device to access their messaging information. A phone number, however, by itself, may not be sufficient to authenticate the user at the messaging service. Accordingly, various embodiments provide additional authentication processes.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a messaging web access system 100. In one embodiment, the messaging web access system 100 may comprise a computer-implemented system having software applications comprising one or more components. Although the messaging web access system 100 shown in FIG. 1 has a limited number of elements in a certain topology, it may be appreciated that the messaging web access system 100 may include more or fewer elements in alternate topologies as desired for a given implementation. As shown in FIG. 1, a remote web browser 190 on a personal computer device 180 may be used as an interface to a messaging service 160. A mobile device 120 may also be used as an interface to the messaging service 160. Both or either of the remote web browser 190 and the mobile device 120 may be used to carry out a messaging conversation with a remote messaging client 170.

A mobile device 120 may communicate with other devices using wireless transmissions to exchange network traffic. Exchanging network traffic, such as may be included in the exchange of a messaging update 110, may comprise transmitting and receiving network traffic via a network interface controller (NIC). A NIC comprises a hardware component connecting a computer device, such as mobile device 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

The mobile device 120 may perform various operation using network data accessed over a network. The mobile device 120 may access a cellular system 130 using cellular signals 135. The cellular system 130 may be a cellular network including data access, the cellular system 130 provided by a cellular provider with which the user of the mobile device 120 has a service contract, the service contract for cellular data server to the mobile device 120. The mobile device 120 may use the cellular system 130 to access the public Internet 150 for interacting with one or more other devices.

The mobile device 120 may access one or more Wi-Fi access points 140 using Wi-Fi signals 145. Wi-Fi access points 140 may be provided by a plurality of different operators. Some of the Wi-Fi access points 140 may be personal in nature, such as a home Wi-Fi network operated by the user of mobile device 120 based on a domestic Internet connection. Some of the Wi-Fi access points 140 may be free of charge or provided as a complimentary portion of a service, such as free Wi-Fi service in coffee shops, hotels, and other public accommodations. The mobile device 120 may use Wi-Fi access points 140 to access the public Internet 150 for interacting with one or more other devices. The dashed line between the Internet 150 and mobile device 120 indicates that the messaging update 110 may be exchanged with other devices ultimately using the Internet 150, with one of the cellular system 130 and Wi-Fi access point 140 acting as the medium to access the Internet 150.

The mobile device 120 may engage in a messaging conversation with a remote local messaging client application 170. The messaging conversation may comprise the exchange of messaging updates such as messaging update 110. Messaging updates may comprise messages, message status updates, and other updates to the status of a messaging conversation.

The same user of the mobile device 120 may own and operate a personal computer device 180. The personal computer device 180 may comprise a Mac OS® device, Windows® device, Linux® device, or other computer device running another operating system. The personal computer device 180 may be an Ethernet device capable of connecting to the Internet 150 via an Ethernet connection. In some embodiments and in some cases the personal computer device 180 may additionally or alternatively use cellular, Wi-Fi, or other networking technologies to the Internet 150. The personal computer device 180 may execute a web browser 190 to access a messaging service 160 and to receive messaging updates such as message update 110 from the mobile device 120 via the messaging service 160.

The messaging service 160 may receive and store messages exchanged between two or more individuals as part of a messaging conversation or chat. The messaging service 160 may receive a message sent, for example, using the mobile device 120, and may forward or push the message to a device of the intended recipient, e.g. the remote messaging client 170. The messaging service 160 may, alternatively or additionally, send a notification to the recipient device that a message has been received, and may allow the recipient device to request or pull the message.

Messaging web access system 100 may include an authorization server (or other suitable component(s)) that allows users to opt in to or opt out of having their actions logged by messaging web access system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of messaging web access system 100 and other elements of a social-networking system through blocking, data hashing, anonymization, or other suitable techniques as appropriate.

Figure 2:
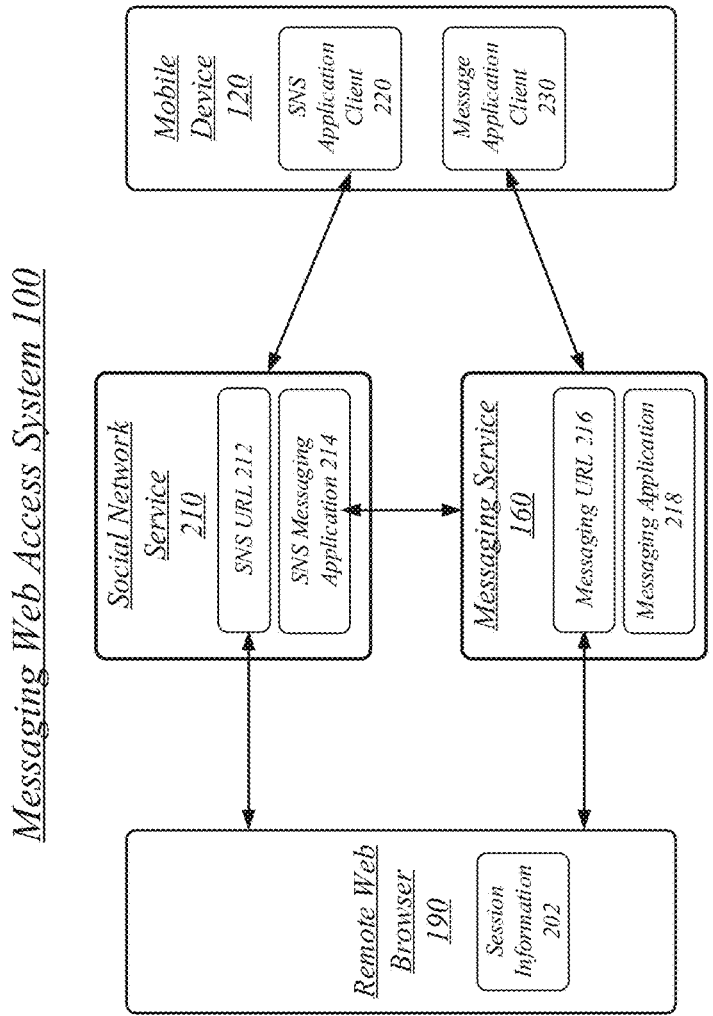
FIG. 2 illustrates an embodiment of the messaging web access system having a social network service and a messaging service each accessible from either a web browser or a mobile device.

FIG. 2 illustrates an embodiment of the messaging web access system 100 in which the messaging service 160 may be accessed from a remote web browser directly, or via a social network service 210, and from a mobile device 120.

As shown in FIG. 2, the remote web browser 190 may access a social network service (SNS) 210 by loading a web page for the SNS at a SNS uniform locator resource (URL) 212. The SNS 210 may require that a user log in to the SNS 210 prior to accessing their content and connections within the SNS 210. For example, the user may need to provide a user name and password. Once the user is successfully logged in to the SNS 210, session information 202 may be generated and stored by the remote web browser 190. The session information 202 may include a session identifier. A session identifier may be used by the remote web browser 190 and the SNS 210 to connect a user automatically to their SNS content, without having to log in again, even after the remote web browser 190 is closed or quit, or the personal computer device 180 is restarted. The session identifier may be specific to a particular web browser, in that accessing the SNS URL 212 from a different remote web browser application would still require the user to log in to the SNS 210.

The SNS 210 may provide messaging functionality with a SNS messaging application 214 to the member users of the SNS 210. For example, the SNS messaging application 214 may allow a member to send a message to another user of the SNS 210 from within the web pages provided by the SNS 210.

The SNS messaging application 214 may access and use the messaging functionality provided by the messaging service 160. For example, a message sent by a user while accessing the SNS 210 from the SNS URL 212 at the remote web browser 190 may be stored by the messaging service 160 and sent to another user within the SNS 210. The messaging service 160 may provide notifications to the recipient users via the SNS 210, which may present, for example, a new message icon, and/or an audible alert that a message is received.

As shown in FIG. 2, the remote web browser 190 may access the messaging service 160 directly by accessing a messaging uniform locator resource (URL) 216. The messaging URL 216 may be different from the SNS URL 212. For example, the SNS URL 212 may be "http://www.facebook.com", while the messaging URL 216 may be "http://www.messenger.com". The messaging service 160 may provide messaging functionality with a messaging application 218. As with the SNS 210, the messaging service 160 may require that the user log in and/or authenticate themselves before accessing their message content. The messaging application 218 may authenticate the user. Once logged in, a second session identifier may be generated and included with session information 202. The second session identifier may allow the user to access their message content automatically without logging in again from that particular remote web browser 190 application, even if their session with the SNS is expired or closed, and/or if the web browser is closed or quit, or the personal computer device 180 is restarted. For example, the remote web browser can later request to load a web page for the messaging application 218. If the request includes the second session identifier, the message data associated with the session identifier can be retrieved without requiring that the user login again.

Once logged in successfully, the user may have access to all of their stored sent and received messages from the messaging service 160, including messages sent and received while using the SNS 210, if the user is also a user of the SNS 210. The messaging service 160 may also provide one or more interfaces within a web browser window to allow the user to read, compose and send messages, and to see which of their messaging contacts are currently online or offline.

The SNS 210 and the messaging service 160 may also be accessed from a mobile device 120. The mobile device 120 may execute a SNS application client 220. The SNS application client 220 may be operated by the user of the mobile device 120 to access the functionality of the SNS 210 from the mobile device 120 without using the SNS URL 212. The SNS application client 220 may allow the user of the mobile device 120 to view, share, and publish content on the SNS 210, and may provide access to the messaging functionality of the SNS 210 to the user of the mobile device 120.

The mobile device 120 may execute a message application client 230. The message application client 230 may be operated by a user of the mobile device 120 to exchange messages with other users via the exchange of messages with their respective devices. A message may comprise one or more of a text sequence, image file, video file, sound file, and any other form of media file. The message application client 230 may use an interface on the mobile device 120 for displaying messages received from other users, receiving the entry of messages by the user of the mobile device 120, and for displaying other user interface elements related to messaging. The message application client 230 may connect directly to the messaging service 160 to access the features of the messaging application 218 without using the messaging URL 216.

In some embodiments, the message application client 230 may be invoked by the SNS application client 220 when the user selects to use the messaging functions of the SNS 210. For example, when the user selects a messaging UI element within the SNS application client 220, the message client application 230 may open and be visible on the mobile device 120, and the SNS application client 220 may be switched to the background on the mobile device 120.

The message application client 230 may be a dedicated message application client 230 that has a primary purpose of messaging. A dedicated message application client 230 may be specifically associated with a messaging provider administering the messaging service 160 including a messaging server. The message application client 230 may be a general client operative to work with a plurality of different messaging providers including the messaging provider administering the messaging platform including the messaging service 160.

The message application client 230 may be associated with a first user account with the messaging service 160. A messaging update 110 may have been received from a second messaging application on a second mobile device, the second messaging application associated with a second user account with the messaging service 160. The messaging update 110 may therefore comprise a message in a messaging conversation between the first user account and the second user account. This may be a message sent from the first user account to the second user account or a message sent from the second user account to the first user account. The message may comprise one or more of a text segment, an image, a video segment, and an audio segment.

Both the remote web browser 190 and the mobile device 120 may be used to originate messages as well as to view messaging originating from each other or from the remote messaging client 170. In various embodiments, however, a user is likely to use only one or the other but not both simultaneously. Either the remote web browser 190 or the mobile device 120 may transmit an outgoing message to a second messaging application, the second messaging application associated with the second user account. This second messaging application may correspond to the remote messaging client 170.

In some embodiments, when a message is received for a user, the messaging service 160 may push a notification and/or the message itself to any messaging endpoint for the recipient having an open session with the messaging service 160. For example, if a user has an unexpired session identifier at the remote web browser 190 and has a web browser connection to the messaging URL 216, then the message and/or a notification of a received message may be pushed to the remote web browser 190. Similarly, if the user has an unexpired session identifier on the mobile device 120 for the message application client 230, then the message and/or a notification of a received message may be pushed to the message application client 230. If the user also, or alternatively, has an open session with the SNS 210 and has a web browser connection to the SNS messaging application 214, then the message and/or a notification of a received message may be pushed to the remote web browser 190 for presentation with the SNS 210 web interface.

In some embodiments, an originating messaging endpoint may be notified when a message sent from that originating endpoint is displayed on the destination messaging endpoint. As such, the message application client 230 and/or the remote web browser 190 may receive an acknowledgement of the outgoing message from the second messaging application and update the outgoing message according to the acknowledgement of the outgoing message. Updating the outgoing message may comprise displaying an icon, symbol, or other visual element adjacent to the outgoing message, the visual element visually associated with the message being viewed by its recipient.

As part of establishing the remote web browser 190 as an endpoint for accessing the messaging service 160, the web session of the remote web browser 190 may be loaded with messaging state for the user account when the user successfully logs in to the messaging service 160 from the remote web browser 190, or has an open session identifier. The remote web browser 190 may receive or retrieve a messaging state associated with the user account from the messaging service 160.

The messaging update may correspond to a messaging conversation between the first user account and a second user account. The messaging state may comprise a history of the messaging conversation between the first user account and the second user account. For example, the user of the mobile device 120 may engage in a messaging conversation with the user of a remote messaging client 170. Initially this conversation may use involve the direct use by the user of the message application client 230 on the mobile device 120.

However, the user may at some point desire to start using their personal computer device 180 to continue the conversation. For example, the user may have been travelling to their home and using the mobile device 120 and then return home and want to use the personal computer device 180. By transmitting the history to the remote web browser 190 on the personal computer device 180, the user may not only continue the conversation but be reminded of the history of that, and other, conversations.

The messaging state may include additional or alternative information, such as the contact list for the first user account. In some cases, the full contact list of a user account may be too lengthy to efficiently send, and as such the messaging state may comprise a portion of the contact list for the first user account. The message application client 230 may retrieve the contact list for the first user account from a local store on the mobile device 120 and determine the portion of the contact list based on messaging activity of the contacts in the contact list.

Figure 3:
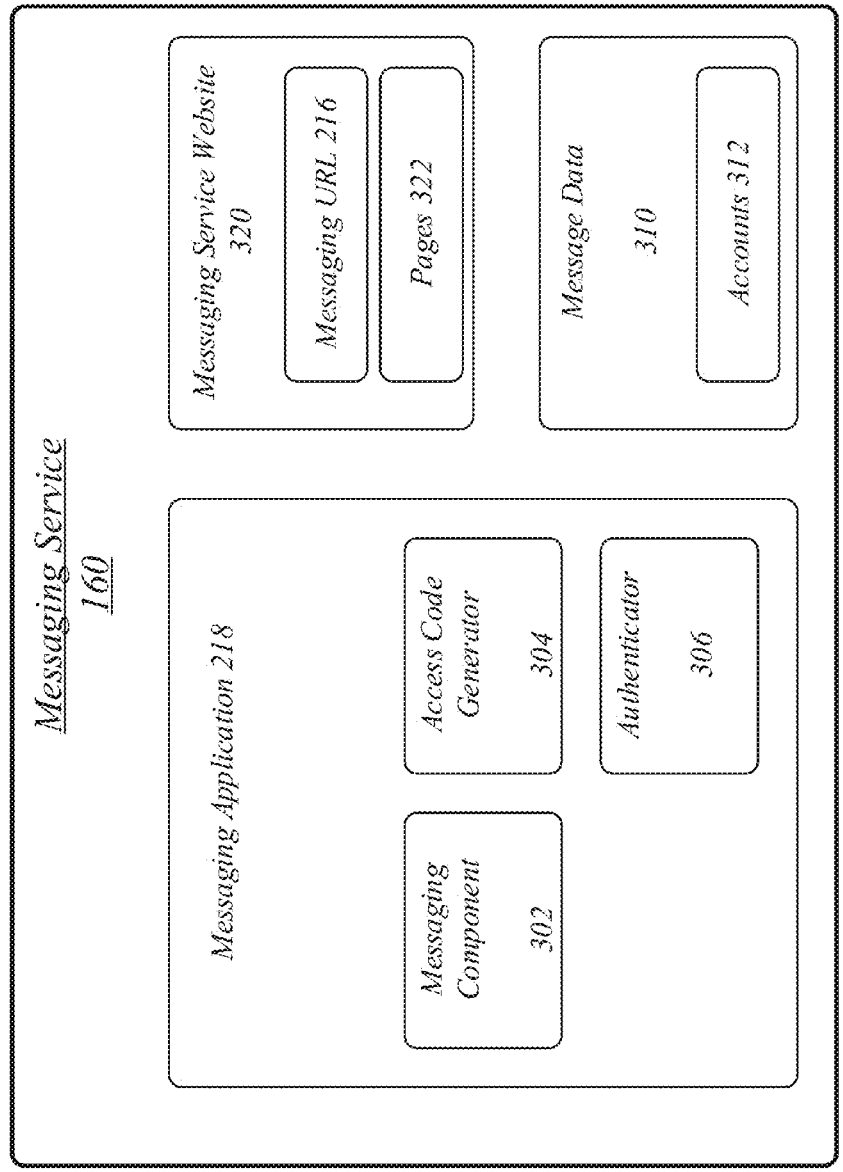
FIG. 3 illustrates an embodiment of the messaging service.

FIG. 3 illustrates an embodiment of the messaging service 160 of the messaging web access system 100. As shown in FIG. 3, the messaging service 160 may include the messaging application 218, message website data 320 and message data 310. More, fewer or other components may be used to provide the functionality described herein.

The messaging application 218 may include one or more functional components, such as a messaging component 302, an access code generator 304, and an authenticator 306. More, fewer, or different components may also be used to provide the functionality described herein.

The messaging component 302 may operate to provide the message receiving and sending functions as described above. That is, the messaging component 302 may receive a message sent by a first user to a second user, store the message, and send the message and/or a notification about the message to the second user.

The access code generator 304 may generate a code to be used to authenticate a user who is attempting to access their messages via the messaging URL 216 and who does not have an account with the SNS 210. The access code may be presented on one device to the user. The user may then need to enter the access code on a second device, which may communicate the access code back to the messaging service 160. For example, the access code may be presented on a web page for logging into the messaging service 160 after the user enters a user identifier such as a user name or a telephone number. The user may then need to enter the access code into their mobile device 120 and using the message application client 230, send the access code back to the messaging service 160. Alternatively, the access code may be sent to and presented on the mobile device 120 after the user enters a user identifier such as a user name or a telephone number into a logging in web page for the messaging service 160. The user would then need to enter the access code into the web site before being able to access their messages.

The access code may be in any format that can be output from one device an input into a second device. For example, the access code may be in a visual format, such as, but not limited to, an alphanumeric text string, a machine-readable optical pattern, e.g. a barcode, an image and so forth. The access code may be in an auditory format, for example, a tone or sequence of tones, and may be detectable or undetectable to human ears. In some embodiments, the access code may be randomly generated and may not have any embedded information. In other embodiments, the access code may include, or be generated from, information that can be used to identify the user, a session identifier, a date or time, a location, or any other information.

The access code may be entered on the second device according to its format. For example, an alphanumeric text string may be entered on a keyboard interface of the second device. A camera on the second device may be used to capture a text string, an image, or a barcode. A scanning operation may also be used with a camera to read a machine-readable optical pattern. An auditory access code may be captured by a microphone and played back out of a speaker, or sent as an audio file. The embodiments are not limited to these examples.

The authenticator 306 may receive the access code generated by the access code generator 304, and the access code received from the second device. The authenticator 306 may compare the two versions of the access code. If they match, then the user may access their message information. In some embodiments, the match may need to be exact. In other embodiments, the two access codes may need to match within a tolerance, to allow for data loss in transmission or during the capture of the access code by the second device.

The matching operation performed by the authenticator 306 may include any operations needed to compare two access codes. The authenticator 306 may include additional processing operations to convert an access code into a digital representation that can be compared to another. For example, if the access code is an alphanumeric text sequence, each character may be compared in order. If the access code is an optical pattern, the results of a scanning operation may be compared to the originally generated pattern. The embodiments are not limited to these examples.

In some embodiments, the authenticator 306 may lookup and/or locate an account associated with the user identifier and/or the second device. The messaging component 302 may use the account information to locate and send the messaging information to the remote web browser 190 when the authentication succeeds.

The messaging service 160 may also include a messaging service website 320. The messaging service website 320 may include the data and operations needed to provide access to the messaging service 160 through a web browser. The messaging service website 320 may include pages 322. The pages 322 may include one or more documents, such as hypertext markup language (HTML) documents, that when loaded by a web browser, present user interface elements that allow a user to log in to the messaging service 160, and to read and compose messages. The messaging service website 320 may be accessed by a user when the messaging URL 216 is loaded by a web browser.

The messaging service 160 may also include message data 310. The message data 310 may include accounts 312. The accounts 312 may include messages, contact lists, statuses, and other message related data indexed to an account of a user. An account 312 may be identified by a user name, a social network profile name, a mobile telephone number, an email address, a network address of a computing device, or any other identifier that specifically identifies one user among many.

Figure 4:
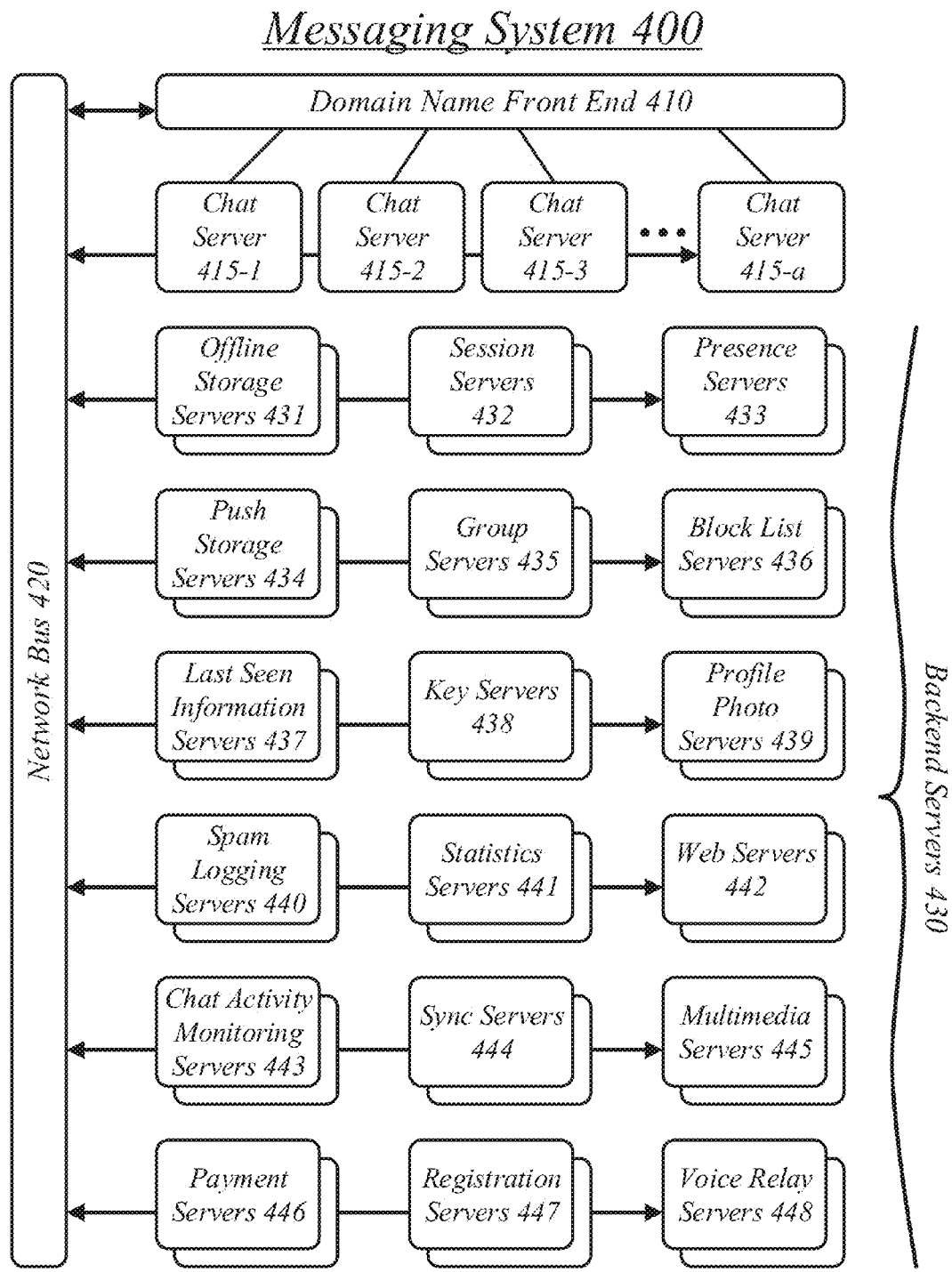
FIG. 4 illustrates an embodiment of a messaging system.

FIG. 4 illustrates an embodiment of a plurality of servers implementing various functions of a messaging system 400. It will be appreciated that different distributions of work and functions may be used in various embodiments of a messaging system 400. The messaging system 400 may comprise the messaging web access system 100 with the operations of the messaging web access system 100 comprising a portion of the overall operations of the messaging system 400.

The messaging system 400 may comprise a domain name front end 410. The domain name front end 410 may be assigned one or more domain names associated with the messaging system 400 in a domain name system (DNS). The domain name front end 410 may receive incoming connections and distribute the connections to servers providing various messaging services.

The messaging system 400 may comprise one or more chat servers 415. The chat servers 415 may comprise front-end servers for receiving and transmitting user-to-user messaging updates such as chat messages. Incoming connections may be assigned to the chat servers 415 by the domain name front end 410 based on workload balancing.

The messaging system 400 may comprise backend servers 430. The backend servers 430 may perform specialized tasks in the support of the chat operations of the front-end chat servers 415. A plurality of different types of backend servers 430 may be used. It will be appreciated that the assignment of types of tasks to different backend serves 430 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 400 may comprise one or more offline storage servers 431. The one or more offline storage servers 431 may store messaging content for currently-offline messaging endpoints in hold for when the messaging endpoints reconnect.

The messaging system 400 may comprise one or more sessions servers 432. The one or more session servers 432 may maintain session state of connected messaging endpoints. The one or more session servers 432 may generate, store, and send session identifiers to messaging endpoints.

The messaging system 400 may comprise one or more presence servers 433. The one or more presence servers 433 may maintain presence information for the messaging system 400. Presence information may correspond to user-specific information indicating whether or not a given user has an online messaging endpoint and is available for chatting, has an online messaging endpoint but is currently away from it, does not have an online messaging endpoint, and any other presence state.

The messaging system 400 may comprise one or more push storage servers 434. The one or more push storage servers 434 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 400 may comprise one or more group servers 435. The one or more group servers 435 may maintain lists of groups, add users to groups, remove users from groups, and perform the reception, caching, and forwarding of group chat messages.

The messaging system 400 may comprise one or more block list servers 436. The one or more block list servers 436 may maintain user-specific block lists, the user-specific incoming-block lists indicating for each user the one or more other users that are forbidden from transmitting messages to that user. Alternatively or additionally, the one or more block list servers 436 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 400 may comprise one or more last seen information servers 437. The one or more last seen information servers 437 may receive, store, and maintain information indicating the last seen location, status, messaging endpoint, and other elements of a user's last seen connection to the messaging system 400.

The messaging system 400 may comprise one or more key servers 438. The one or more key servers may host public keys for public/private key encrypted communication.

The messaging system 400 may comprise one or more profile photo servers 439. The one or more profile photo servers 439 may store and make available for retrieval profile photos for the plurality of users of the messaging system 400.

The messaging system 400 may comprise one or more spam logging servers 440. The one or more spam logging servers 440 may log known and suspected spam (e.g., unwanted messages, particularly those of a promotional nature). The one or more spam logging servers 440 may be operative to analyze messages to determine whether they are spam and to perform punitive measures, in some embodiments, against suspected spammers (users that send spam messages).

The messaging system 400 may comprise one or more statistics servers 441. The one or more statistics servers may compile and store statistics information related to the operation of the messaging system 400 and the behavior of the users of the messaging system 400.

The messaging system 400 may comprise one or more web servers 442. The one or more web servers 442 may engage in hypertext transport protocol (HTTP) and hypertext transport protocol secure (HTTPS) connections with web browsers. The one or more web servers 442 may, in some embodiments, host the SNS 210 and/or the messaging service 160 as part of the operation of the messaging web access system 100.

The messaging system 400 may comprise one or more chat activity monitoring servers 443. The one or more chat activity monitoring servers 443 may monitor the chats of users to determine unauthorized or discouraged behavior by the users of the messaging system 400. The one or more chat activity monitoring servers 443 may work in cooperation with the spam logging servers 440 and block list servers 436, with the one or more chat activity monitoring servers 443 identifying spam or other discouraged behavior and providing spam information to the spam logging servers 440 and blocking information, where appropriate to the block list servers 436.

The messaging system 400 may comprise one or more sync servers 444. The one or more sync servers 444 may sync the messaging system 440 with contact information from a messaging endpoint, such as an address book on a mobile phone, to determine contacts for a user in the messaging system 400.

The messaging system 400 may comprise one or more multimedia servers 445. The one or more multimedia servers may store multimedia (e.g., images, video, audio) in transit between messaging endpoints, multimedia cached for offline endpoints, and may perform transcoding of multimedia.

The messaging system 400 may comprise one or more payment servers 446. The one or more payment servers 446 may process payments from users. The one or more payment servers 446 may connect to external third-party servers for the performance of payments.

The messaging system 400 may comprise one or more registration servers 447. The one or more registration servers 447 may register new users of the messaging system 400.

The messaging system 400 may comprise one or more voice relay servers 448. The one or more voice relay servers 448 may relay voice-over-internet-protocol (VoIP) voice communication between messaging endpoints for the performance of VoIP calls.

Figure 5:
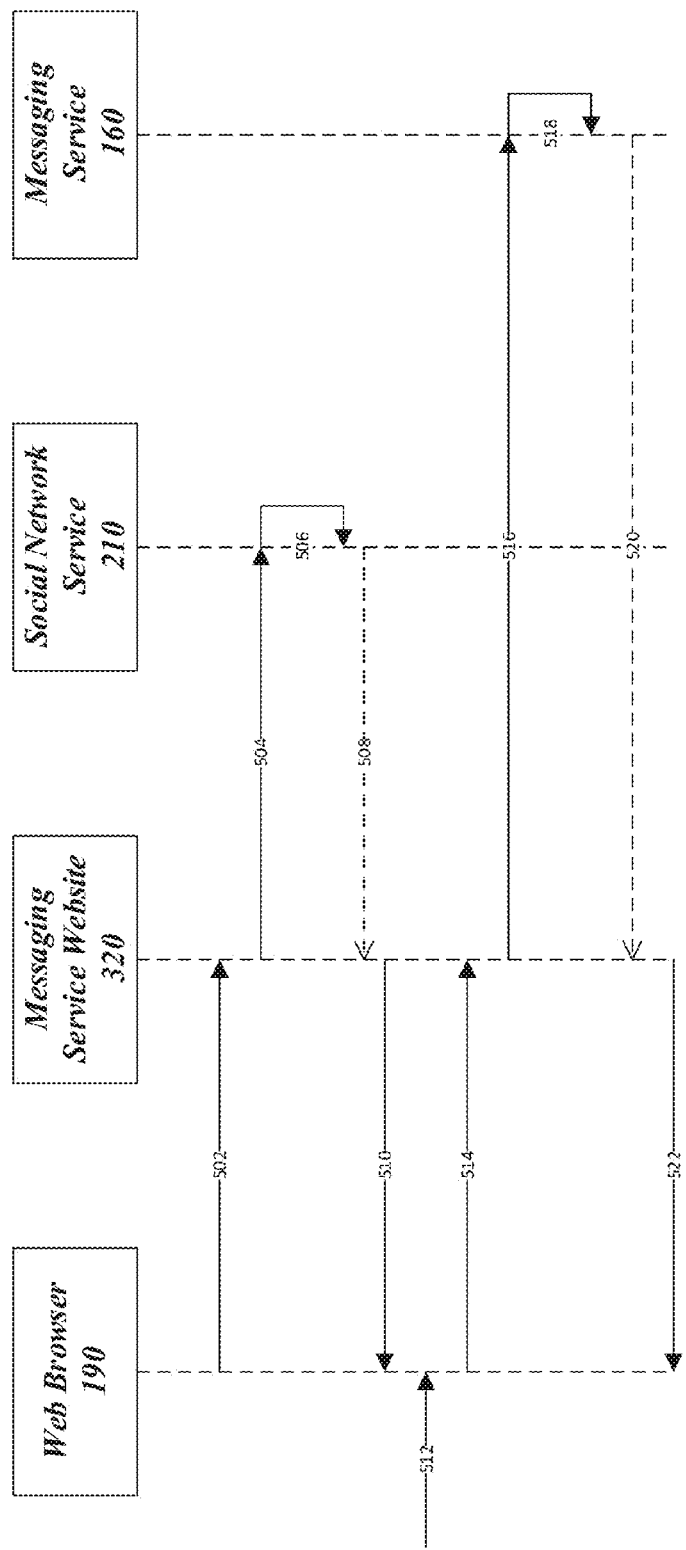
FIG. 5 illustrates an embodiment of a message flow for the messaging web access system.

FIG. 5 illustrates an embodiment of a message flow 500 for the system 100. The message flow 500 may represent messages communicated among the components of system 100. As used in FIG. 5, a "message" may include data and/or instructions communicated from one component to another, as well as internal functions within a component, and is distinct from the chat messages sent from a sender to a recipient. In particular, the message flow 500 may occur among the remote web browser 190, the messaging service website 320, the social network service 210 and the messaging service 160.

In message flow 500, time flows from the top of the diagram toward the bottom. Message flow 500 may represent messages communicated among the components when a user tries to access messages at the messaging service 160 from the messaging service website 320 and where the user has an account with the SNS 210.

The message flow 500 begins when the web browser 190 requests to load the page at the messaging service website 320 using the messaging service URL 216, in message 502. The message 502 may include a session identifier (ID). The session ID indicates that the user has an open session with the SNS 210 at the web browser 190. An "open" session means that the user has used the web browser 190 to log into the SNS 210 and has not logged out of the SNS 210, and that an expiration period has not passed. The user may or may not be accessing or viewing the SNS 210 in a web browser window at the time of message 502.

The message flow 500 continues when the messaging service website 320 requests user information from the SNS 210 in message 504. The message 504 may include the session ID received from the web browser 190. In an embodiment, the presence of the session ID in the message 502 may cause the messaging service website 320 to request the user information from the SNS 210 automatically.

The message flow 500 continues when the SNS 210 retrieves the requested user information in message 506. For example, the session ID may be linked to or otherwise identify a particular user of the SNS 210. The retrieved user information may include, for example, a user name, a profile name (if different from the user name), a profile photograph or other components of the user's social network identity.

The message flow 500 continues when the SNS 210 transmits the requested user information back to the messaging service website 320 in message 508. The message 508 may include a text element that contains the user or profile name, and may include an image element that contains a copy of the profile photograph. In another embodiment, the message 508 may include a link or a reference to the user information elements such that the messaging service website 320 can retrieve the elements.

The message flow 500 continues when messaging service website 320 presents a user interface (UI) that shows the received user information in message 510. For example, the user interface may present an option to log into the messaging service 160 using the social network user information. The UI may display the user or profile name and the profile photograph, or any other user information, along with a selectable login UI element.

The message flow 500 continues when the user issues a control directive to the web browser 190 that selects the selectable login UI element in message 512. The message 512 indicates that the user wishes to use their existing SNS session to access their messaging data.

The message flow 500 continues when the web browser 190 sends a login request to the messaging service website 320 in message 514, in response to the control directive in message 512.

The message flow 500 continues when the messaging service website 320 requests message data for the user from the messaging service 160 in message 516, in response to receiving the login request in message 512. The message 516 may include information to identify the user's message account, such as the user name or the session ID.

The message flow 500 continues when the messaging service 160 retrieves the message data for the user in message 518. The retrieved message data may include some or all of the stored messages for the user, including sent and received messages, and read and unread messages. The retrieved message data may also include unsent messages drafts, group conversation messages, message status updates, and other updates to the status of a messaging conversation.

The message flow 500 continues when the messaging service 160 transmits the retrieved message data to the messaging service website 320 in message 520. The message 520 may include actual message content, and/or links or references to stored message content and data.

The message flow 500 continues when the messaging service website 320 renders the message data in a message graphical user interface, in message 522. The messaging service website 320 may present one or more pages 322 that allow the user to view one or more of their chat messages, conversations, contact presence, and/or new message composition UI elements.

Figure 6:
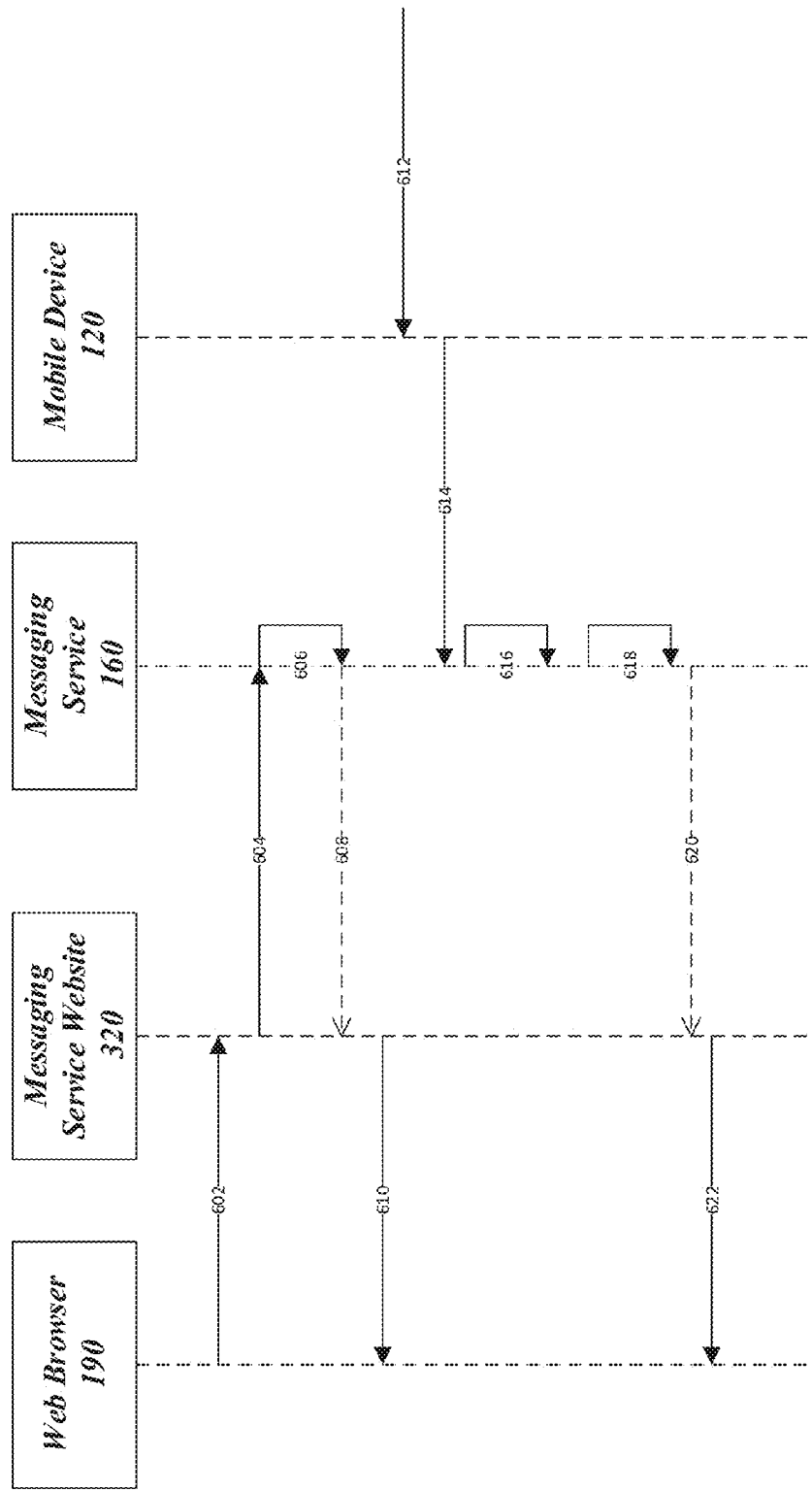
FIG. 6 illustrates an embodiment of a second message flow for the messaging web access system.

FIG. 6 illustrates an embodiment of a message flow 600 for the system 100. The message flow 600 may represent messages communicated among the components of system 100. As used in FIG. 6, a "message" may include data and/or instructions communicated from one component to another, as well as internal functions within a component, and is distinct from the chat messages sent from a sender to a recipient. In particular, the message flow 600 may occur among the remote web browser 190, the messaging service website 320, the messaging service 160, and a mobile device 120.

In message flow 600, time flows from the top of the diagram toward the bottom. Message flow 600 may represent messages communicated among the components when a user tries to access messages at the messaging service 160 from the messaging service website 320 and where the user does not have an account with the SNS 210.

The message flow 600 begins when the web browser 190 requests to load the page at the messaging service website URL 216, in message 602. The message 602 may include a user identifier. The user identifier may be a user name, a telephone number corresponding to the mobile device 120, a network address corresponding to the mobile device 120, an email address, or other means for identifying a user message account.

The message flow 600 continues when the messaging service website 320 requests an access code for the user identifier from the messaging service 160, in message 604. The message 604 may include the user identifier provided by the user in the message 602.

The message flow 600 continues when the messaging service 160 generates an access code in message 606. The access code may be, for example, an alphanumeric text sequence, a machine-readable optical pattern, a sound, or any other data structure that can be output from the website 216 and captured by a second device, such as the mobile device 120. In another embodiment, the access code may be generated by the messaging service website 320 and sent to the messaging service 160.

The message flow 600 continues when the messaging service 160 transmits the access code to the messaging service website 320 in message 608.

The message flow 600 continues when the messaging service website 320 presents the access code on a web page to the user, in message 610. If the access code is visual, it may be displayed on the web page. If the access code is audible, a playback UI element may be presented so that the user can cause the access code to be played through a speaker.

The message flow 600 may continue when the user enters the access code from the web page into their mobile device 120, in message 612. For example, the user may use a keyboard component to type in an alphanumeric string. The user may speak the alphanumeric characters and the mobile device 120 may use a speech-to-text converter to convert the spoken characters to text. The user may use a camera on the mobile device 120 to scan an optical pattern, or to photograph the access code. The user may record an audio access code with a microphone on the mobile device 120. The embodiments are not limited to these examples.

The message flow 600 continues when the mobile device 120 sends the entered access code to the messaging service 160 in message 614. In some embodiments, the mobile device 120 may convert the format of the entered access code to a format expected by the messaging service 160 prior to sending the message 614. For example, an analog audio recording may be digitized, or the format of the access code may be hashed.

The message flow 600 continues when the messaging service 160 compares the access code generated in message 606 with the access code received in message 614, in message 616. If the two access codes match, or match within a tolerance, the messaging service 160 may have confidence that the user attempting to log in via the messaging service website 320 is the same user associated with the mobile device 120 and an account associated with the user identifier and the mobile device 120.

The message flow 600 continues, assuming that the two access codes were matched, when the messaging service 160 retrieves the message data for the user, in message 618. The retrieved message data may include some or all of the stored messages for the user, including sent and received messages, and read and unread messages. The retrieved message data may also include unsent messages drafts, group conversation messages, message status updates, and other updates to the status of a messaging conversation.

The message flow 600 continues when the messaging service 160 transmits the retrieved message data to the messaging service website 320 in message 620. The message 620 may include actual message content, and/or links or references to stored message content and data.

The message flow 600 continues when the messaging service website 320 renders the message data in a message graphical user interface, in message 622. The messaging service website 320 may present one or more pages 322 that allow the user to view one or more of their chat messages, conversations, contact presence, and/or new message composition UI elements.

Figure 7:
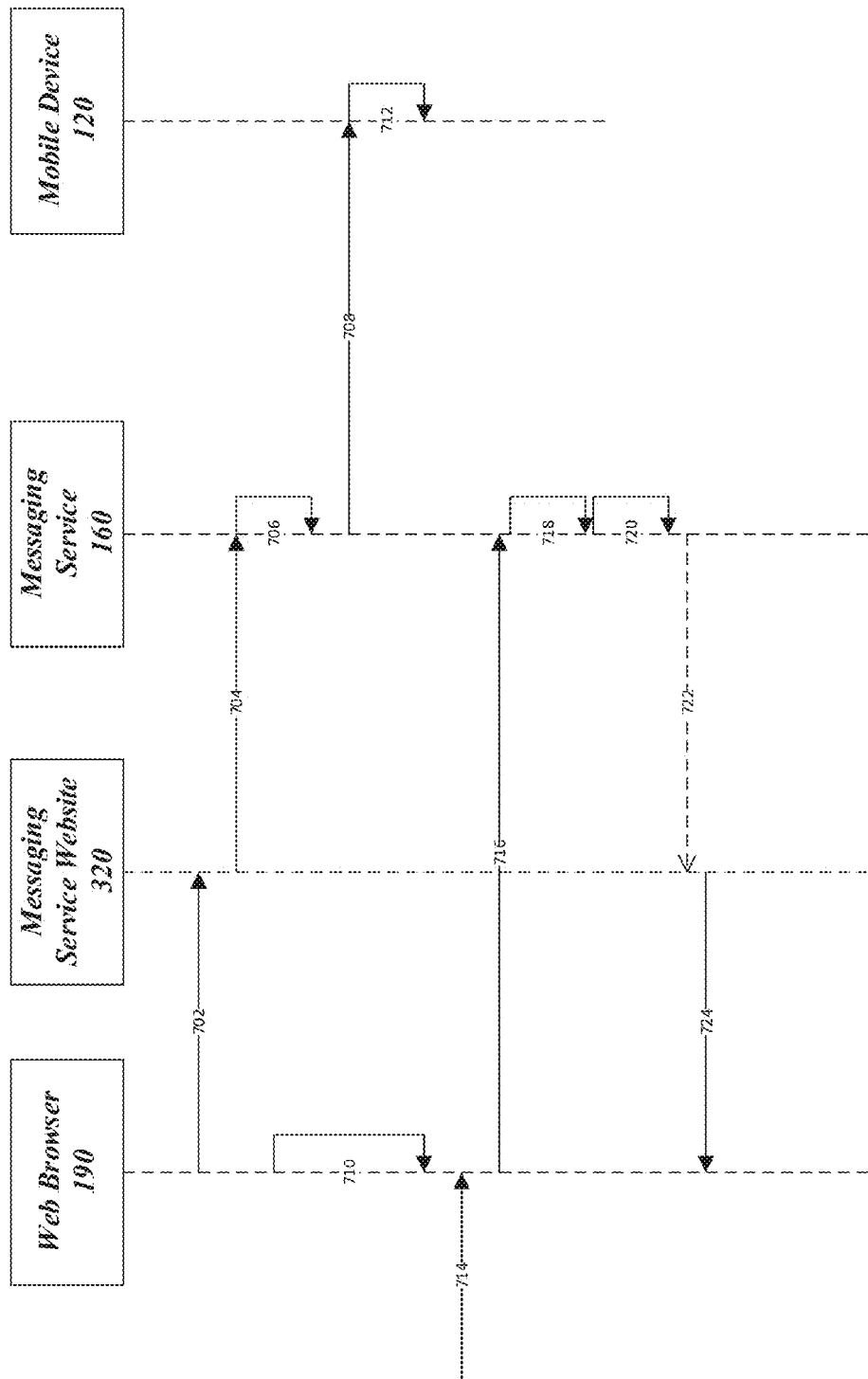
FIG. 7 illustrates an embodiment of a third message flow for the messaging web access system.

FIG. 7 illustrates an embodiment of a message flow 700 for the system 100. The message flow 700 may represent messages communicated among the components of system 100. As used in FIG. 7, a "message" may include data and/or instructions communicated from one component to another, as well as internal functions within a component, and is distinct from the chat messages sent from a sender to a recipient. In particular, the message flow 700 may occur among the remote web browser 190, the messaging service website 320, the messaging service 160, and a mobile device 120.

In message flow 700, time flows from the top of the diagram toward the bottom. Message flow 700 may represent messages communicated among the components when a user tries to access messages at the messaging service 160 from the messaging service website 320 and where the user does not have an account with the SNS 210.

The message flow 700 begins similarly to the message flow 600, and messages 702, 704 and 706 are analogous to messages 602, 604, and 606.

The message flow 700 differs from the message flow 600 once the access code is generated in message 706. The message flow 700 continues when the messaging service 160 sends the access code to the mobile device 120 associated with the user identifier, in message 708. The access code may be, for example, sent directly to the message application client 230, or may be sent as an email message, a text message, a voice mail message, and so forth.

At any point after sending message 702, the messaging service website 320 may present a user interface for access code entry in message 710. For example, the messaging service website 320 may provide a text entry field for accepting a typed alphanumeric string, or may provide a UI element that causes an image or a sound file to be uploaded.

The message flow 700 continues when the mobile device 120 presents the received access code in a user interface, in message 712. For example, the access code may be displayed on a lock screen or a home screen of the mobile device, or within the message application client 230.

The message flow 700 continues when the user enters the access code presented on the mobile device 120 into the messaging service website 320 in message 714. For example, the user may type an alphanumeric code into a text entry field on the web page, or may hold an image or optical pattern up to a camera connected to the computer device 180.

The message 700 continues when the messaging service website 320 sends a request for message data for the user to the messaging service 160, in message 716. The message 716 may include the access code entered by the user at the website.

Messages 718, 720, 722, and 724 may be the same as the messages 616, 618, 620, and 622, respectively. Namely, the two access codes may be compared, and when they match, the message data for the user may be sent to the website and presented in a user interface.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
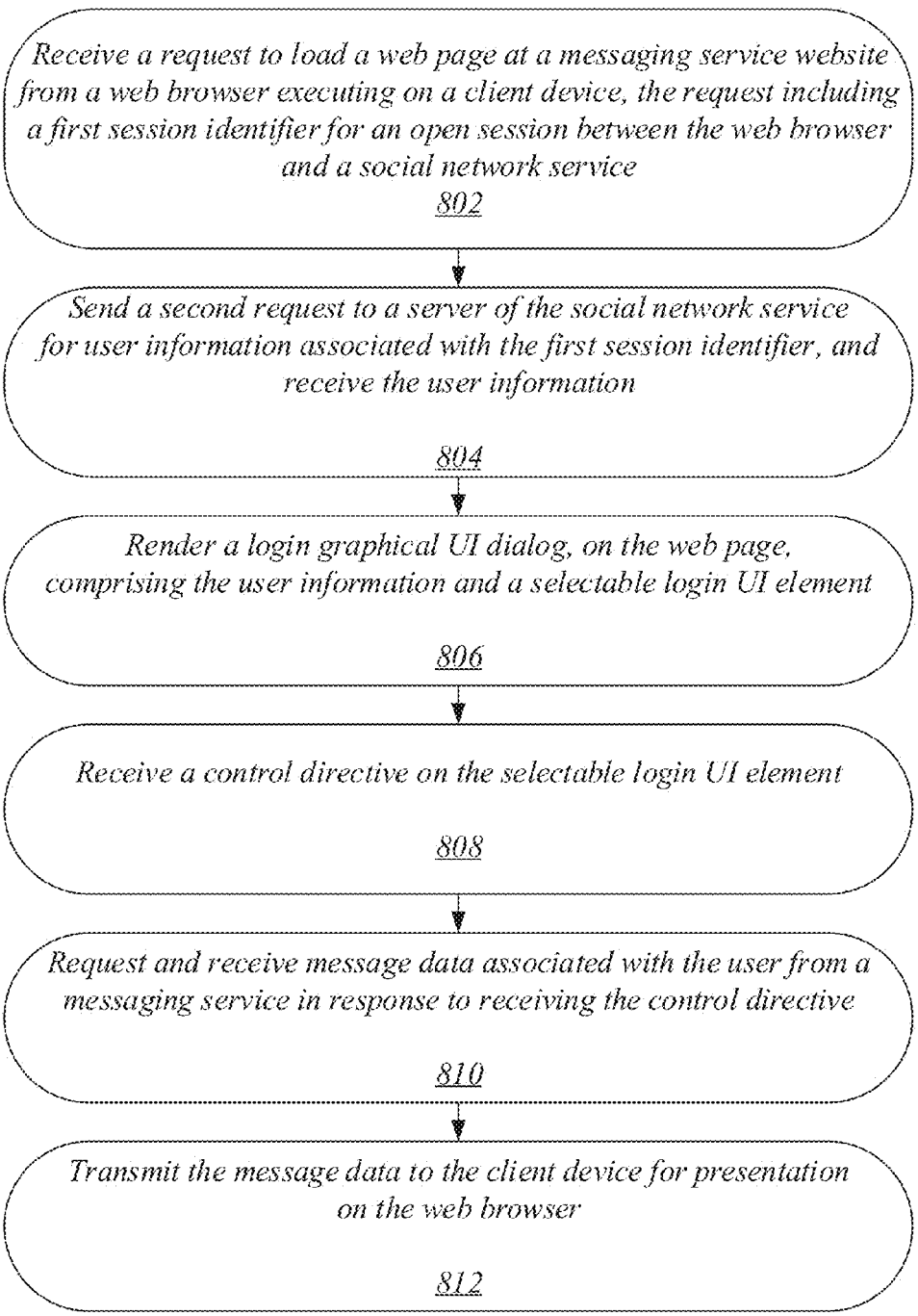
FIG. 8 illustrates an embodiment of a logic flow for the messaging web access system.

FIG. 8 illustrates one embodiment of a logic flow 800. The logic flow 800 may be representative of some or all of the operations executed by one or more embodiments described herein. In particular, the logic flow 800 may illustrate operations performed when a user wants to access the messaging service 160 at the messaging URL 216 and already has an open session with the social network service 210.

In the illustrated embodiment shown in FIG. 8, the logic flow 800 may receive a request to load a web page at a messaging service website from a web browser executing on a client device in block 802. For example, the remote web browser 190 may request to load the messaging service website 320 using the messaging service URL 216. The request may include a first session identifier for an open session between the web browser 190 and a social network service 210.

The logic flow 800 may send a second request to a server of the social network service for user information associated with the first session identifier, and receive the user information in block 804. For example, the messaging service website 320 may request the user information from the social network service 210. The request may include the first session identifier.

The logic flow 800 may render a login graphical UI dialog on the web page, comprising the user information and a selectable login UI element in block 806. For example, the messaging service website 320 may receive user information including a profile picture and a user name associated with the user's account at the social network service 210. The messaging service website 320 may provide the user information to the web browser 190 for rendering a login UI dialog. The login UI dialog may show the user information, and a selectable UI element, e.g. a button, a menu selection, a checkbox, and so forth. In some embodiments, the selectable UI element may include some or all of the user information.

The logic flow 800 may receive a control directive on the selectable login UI element in block 808. For example, the user may use an input device to select the login UI element. The control directive may signify that the user wishes to login to the messaging service 160 using their social network service 210 account information.

The logic flow 800 may request and receive message data associated with the user from a messaging service in response to receiving the control directive in block 810. For example, the messaging service website 320 may request the message data 310 from the messaging service 160. The request may include the first session identifier and/or some or all of the user information, or other means to identify the particular account 312 for which to retrieve message data 310. In an embodiment, the messaging service website 320 may request the message data 310 via the social network service 210, where the social network service 210 identifies from which account 312 to retrieve message data.

The logic flow 800 may transmit the message data to the client device for presentation on the web browser in block 812. For example, the messaging service 160 may look up the message data 310 for the identified user, and may transmit the message data 310 to the messaging service website 320, which may cause the message data 310 to be presented in the web browser 190. The message data 310 may include sent and received messages for the user, both read and unread, as well as draft messages, attached files and links, status updates and any other information needed to render a messaging interface on the web browser 190.

Figure 9:
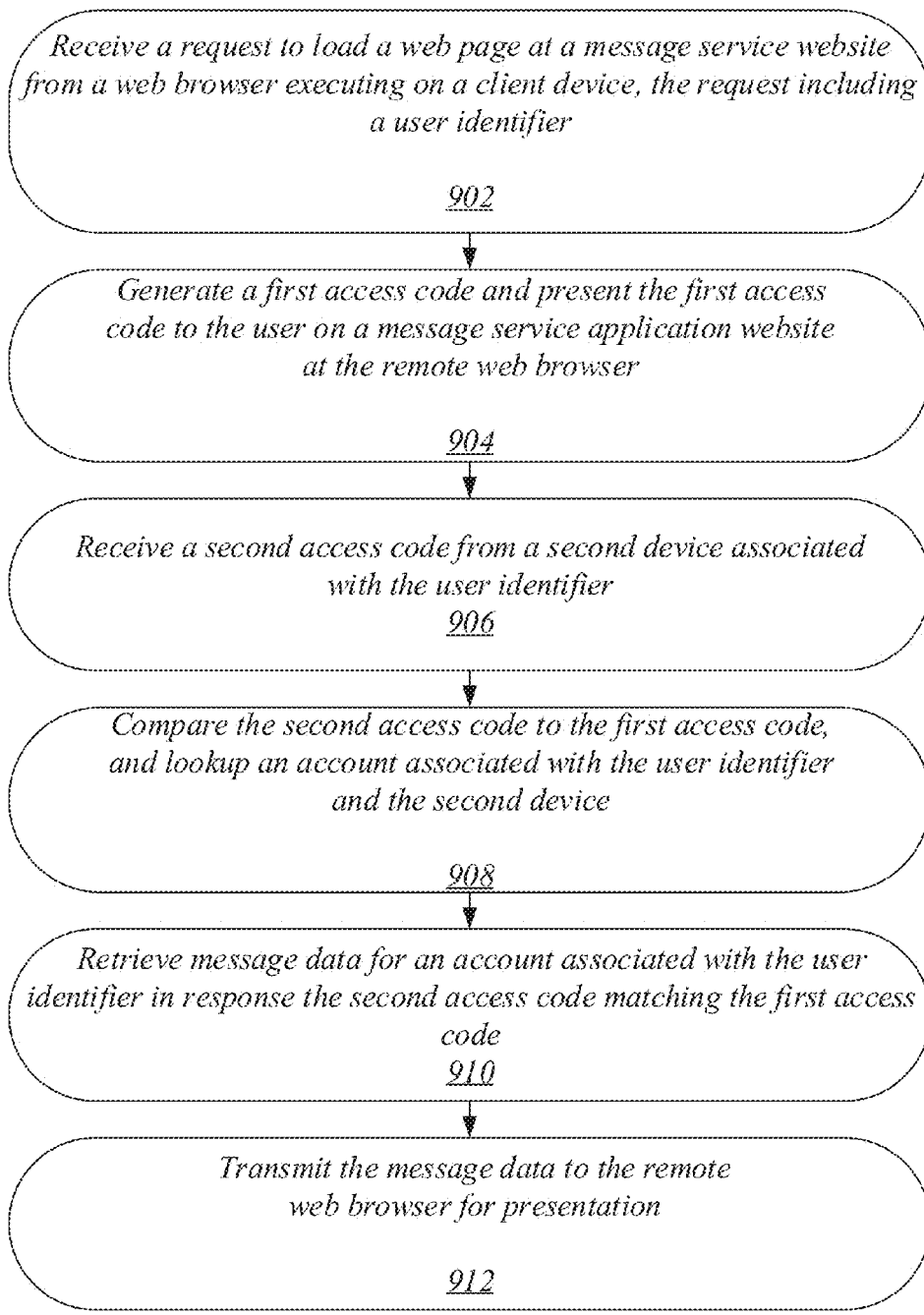
FIG. 9 illustrates an embodiment of a second logic flow for the messaging web access system.

FIG. 9 illustrates one embodiment of a logic flow 900. The logic flow 900 may be representative of some or all of the operations executed by one or more embodiments described herein. In particular, the logic flow 900 may illustrate operations performed when a user wants to access the messaging service 160 at the messaging URL 216 and without an open session with the social network service 210.

In the illustrated embodiment shown in FIG. 9, the logic flow 900 may receive a request to load a web page at a messaging service website from a web browser executing on a client device, the request including a user identifier in block 902. For example, the remote web browser 190 may present the page of the messaging service website 320 corresponding to the messaging service URL 216. The page may include an entry field where the user can enter a user identifier and select a UI element to request logging into the messaging service 160. The logging in request may include the user identifier, such as a mobile telephone number, a network address, an email address, or other user identifier associated with a user account 310 at the messaging service 160.

The logic flow 900 may generate a first access code and present the first access code to the user on a messaging service website at the remote web browser in block 904. For example, the access code generator 304 may generate an access code comprising an alphanumeric sequence, a machine-readable optical pattern, an audio signal or a visual image. The access code may be presented on the web page of the messaging service website 320. If the access code is a visual access code, the access code may be displayed on the web page directly. If the access code is an audio signal, a UI element may be presented that, when selected by a control directive, outputs the audio signal via a speaker on the computer device 180. In addition to presenting the access code, the web page may also prompt the user to enter the access code into their mobile device 120.

The logic flow 900 may receive a second access code from a second device associated with the user identifier in block 906. For example, the messaging service 160 may receive an access code entered into the user's mobile device 120 and sent to the messaging service 160 from the mobile device 120. The second access code may be received, for example, from the message application client 230, as an email message, as a text message, and so forth.

The logic flow 900 may compare the second access code to the first access code, and lookup an account associated with the user identifier and the second device in block 908. For example, the authenticator 306 may compare the two access codes to determine whether they match. In some embodiments, an exact match may be needed for authentication. In other embodiments, a match within a tolerance, e.g. a 98% or 99% match, may be sufficient, to allow for data loss and corruption. If the two access codes match, the authenticator 306 may then identify an account 312 associated with the user identifier and/or the mobile device 120.

The logic flow 900 may retrieve message data for an account associated with the user identifier in response the second access code matching the first access code in block 910. For example, the messaging component 302 may use the identified account 312 to retrieve the message data 310 for the user.

The logic flow 900 may transmit the message data to the remote web browser for presentation in block 912. For example, the messaging service 160 may transmit the message data 310 to the messaging service website 320, which may cause the message data 310 to be presented in the web browser 190. The message data 310 may include sent and received messages for the user, both read and unread, as well as draft messages, attached files and links, status updates and any other information needed to render a messaging interface on the web browser 190.

Figure 10:
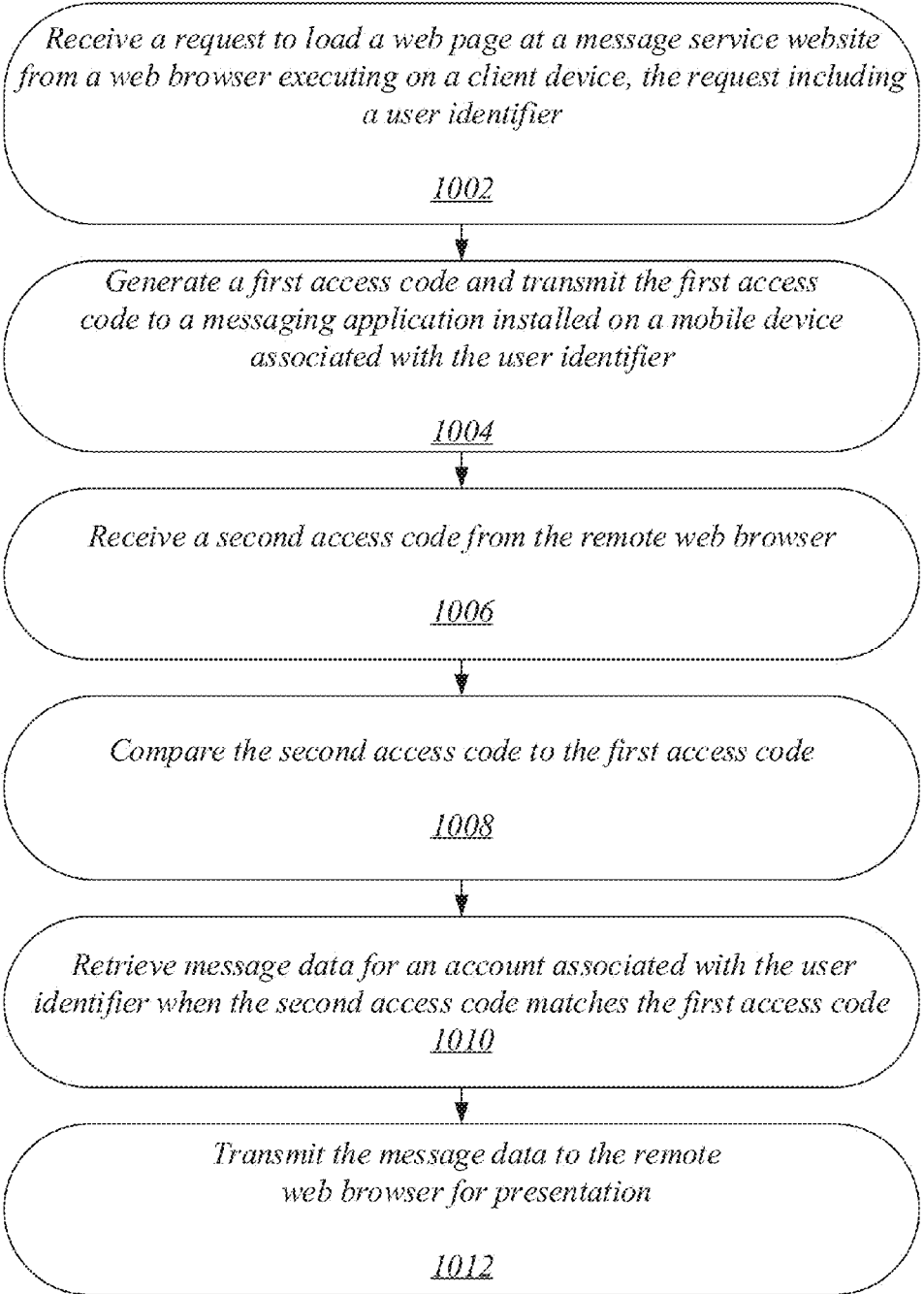
FIG. 10 illustrates an embodiment of a third logic flow for the messaging web access system.

FIG. 10 illustrates one embodiment of a logic flow 1000. The logic flow 1000 may be representative of some or all of the operations executed by one or more embodiments described herein. In particular, the logic flow 1000 may illustrate other operations performed when a user wants to access the messaging service 160 at the messaging URL 216 and without an open session with the social network service 210.

In the illustrated embodiment shown in FIG. 10, the logic flow 1000 may receive a request to load a web page at a messaging service website from a web browser executing on a client device, the request including a user identifier, in block 1002. For example, as in block 902, the remote web browser 190 may present the page of the messaging service website 320 corresponding to the messaging service URL 216. The page may include an entry field where the user can enter a user identifier and select a UI element to request logging into the messaging service 160. The logging in request may include the user identifier, such as a mobile telephone number, a network address, an email address, or other user identifier associated with a user account 310 at the messaging service 160.

The logic flow 1000 may generate a first access code and transmit the first access code to a messaging application installed on a mobile device associated with the user identifier in block 1004. The access code may be generated as described with respect to block 904 in logic flow 900. The access code may, however, be transmitted to a mobile device 120 associated with the user identifier rather than presenting the access code on the browser. The first access code may be transmitted to the mobile device 120, for example, to the message application client 230, as an email message, as a text message, and so forth. The mobile device 120 may prompt the user to enter the first access code into a field on the web page at the messaging service website 320.

The logic flow 1000 may receive a second access code from the remote web browser in block 1006. For example, the user may have entered the first access code into a field in a web page for the messaging service website 320. The user may, for example, have typed in an alphanumeric sequence, or used a camera in communication with the computer device 180 to capture an image or scan a machine-readable optical pattern. The messaging service website 320 may send the entered access code to the messaging application 218.

The logic flow 1000 may compare the second access code to the first access code in block 1008. For example, as in block 908, the authenticator 306 may compare the two access codes to determine whether they match. If the two access codes match, the authenticator 306 may then identify an account 312 associated with the user identifier and/or the mobile device 120.

The logic flow 1000 may retrieve message data for an account associated with the user identifier when the second access code matches the first access code in block 1010. For example, the messaging component 302 may use the identified account 312 to retrieve the message data 310 for the user.

The logic flow 1000 may transmit the message data to the remote web browser for presentation in block 1012. For example, as in block 912, the messaging service 160 may transmit the message data 310 to the messaging service website 320, which may cause the message data 310 to be presented in the web browser 190.

Figure 11:
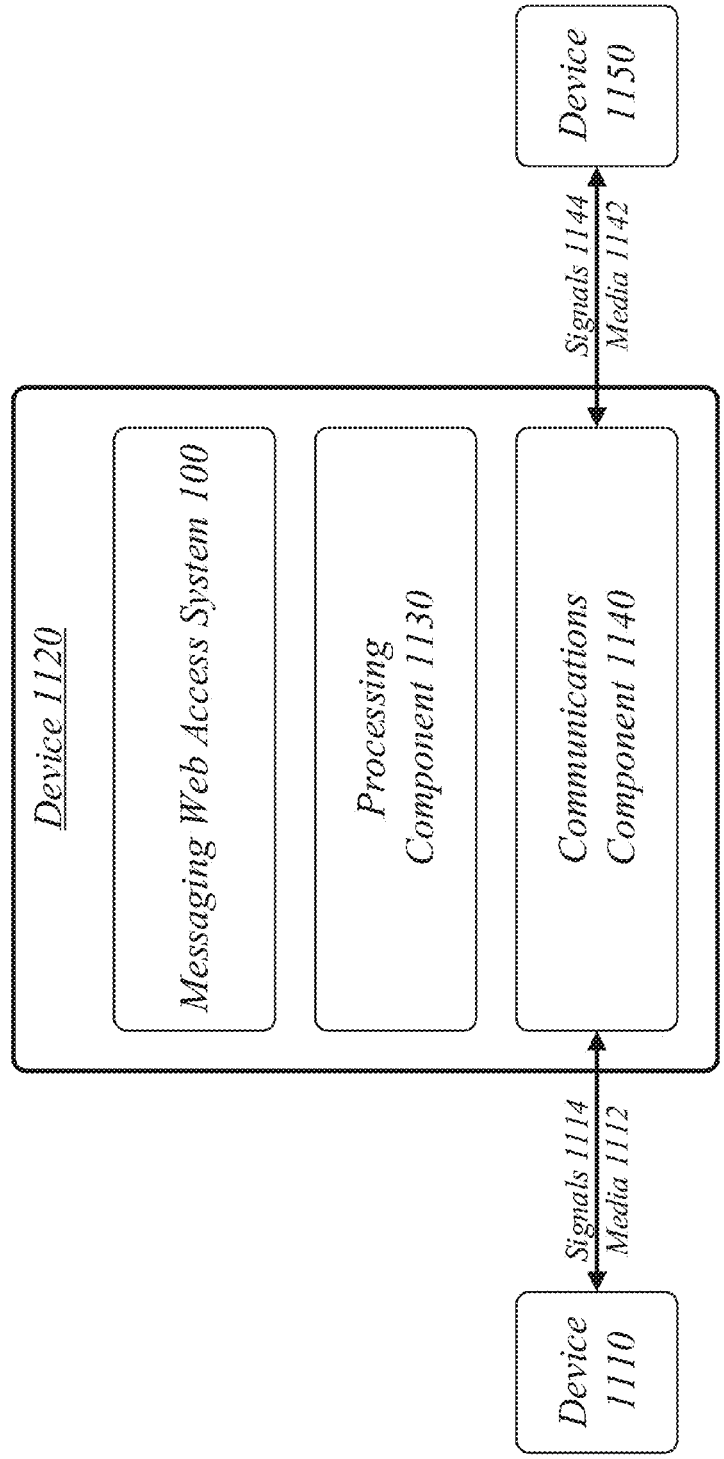
FIG. 11 illustrates an embodiment of a centralized system for the system of FIG. 1.

FIG. 11 illustrates a block diagram of a centralized system 1100. The centralized system 1100 may implement some or all of the structure and/or operations for the messaging web access system 100 in a single computing entity, such as entirely within a single device 1120.

The device 1120 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1120 may execute processing operations or logic for the system 100 using a processing component 1130. The processing component 1130 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1120 may execute communications operations or logic for the system 100 using communications component 1140. The communications component 1140 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1140 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1112, 1142 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1120 may communicate with other devices 1110, 1150 over a communications media 1112, 1142, respectively, using communications signals 1114, 1144, respectively, via the communications component 1140. The devices 1110, 1150 may be internal or external to the device 1120 as desired for a given implementation. The device 1110 may comprise a messaging endpoint, such as message application client 230 on mobile device 120. The device 1150 may comprise a second messaging endpoint, such as remote web browser 190 on personal computer device 180. The signals 1114 and 1144 may jointly carry the encrypted connection between the message application client 230 and the remote web browser 190.

Figure 12:
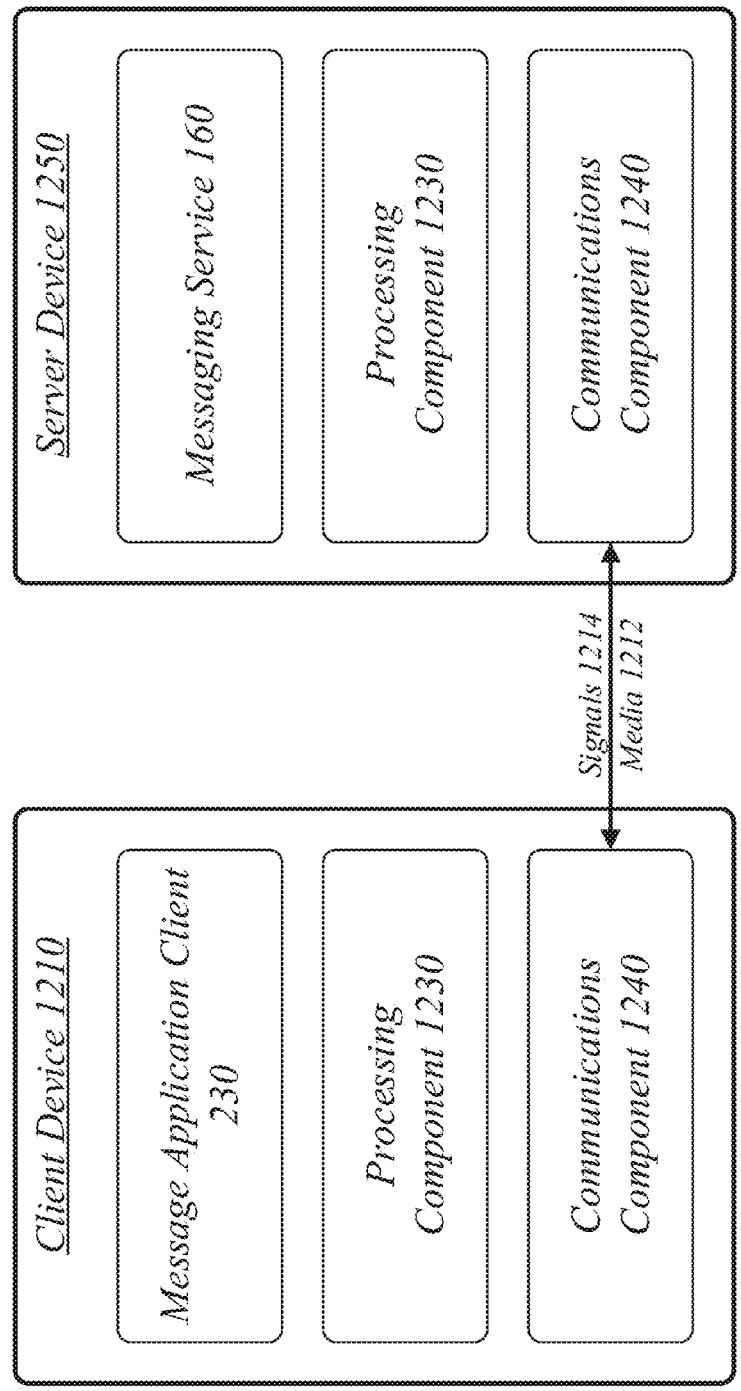
FIG. 12 illustrates an embodiment of a distributed system for the system of FIG. 1.

FIG. 12 illustrates a block diagram of a distributed system 1200. The distributed system 1200 may distribute portions of the structure and/or operations for the system 100 across multiple computing entities. Examples of distributed system 1200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1200 may comprise a client device 1210 and a server device 1250. In general, the client device 1210 and the server device 1250 may be the same or similar to the client device 1120 as described with reference to FIG. 11. For instance, the client system 1210 and the server system 1250 may each comprise a processing component 1230 and a communications component 1240 which are the same or similar to the processing component 1130 and the communications component 1140, respectively, as described with reference to FIG. 11. In another example, the devices 1210, 1250 may communicate over a communications media 1212 using communications signals 1214 via the communications components 1240.

The client device 1210 may comprise or employ one or more client programs that operate to perform various methodologies in accordance with the described embodiments. In one embodiment, for example, the client device 1210 may implement the message application client 230.

The server device 1250 may comprise or employ one or more server programs that operate to perform various methodologies in accordance with the described embodiments. In one embodiment, for example, the server device 1250 may implement the messaging service 160.

Figure 13:
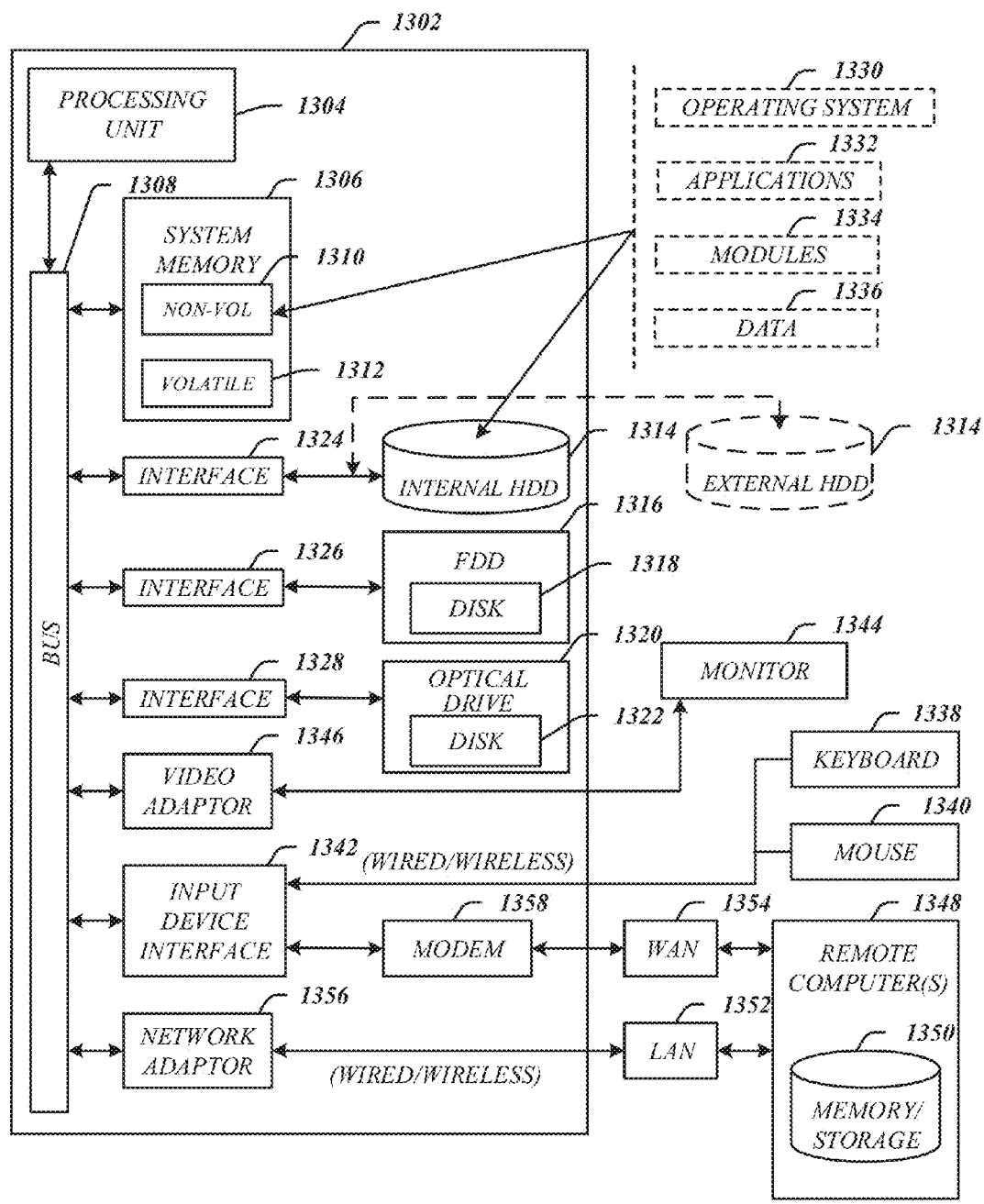
FIG. 13 illustrates an embodiment of a computing architecture.

FIG. 13 illustrates an embodiment of an exemplary computing architecture 1300 suitable for implementing various embodiments as previously described. In one embodiment, the computing architecture 1300 may comprise or be implemented as part of an electronic device. Examples of an electronic device may include those described with reference to FIG. 1, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the messaging web access system 100.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.5 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.5x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
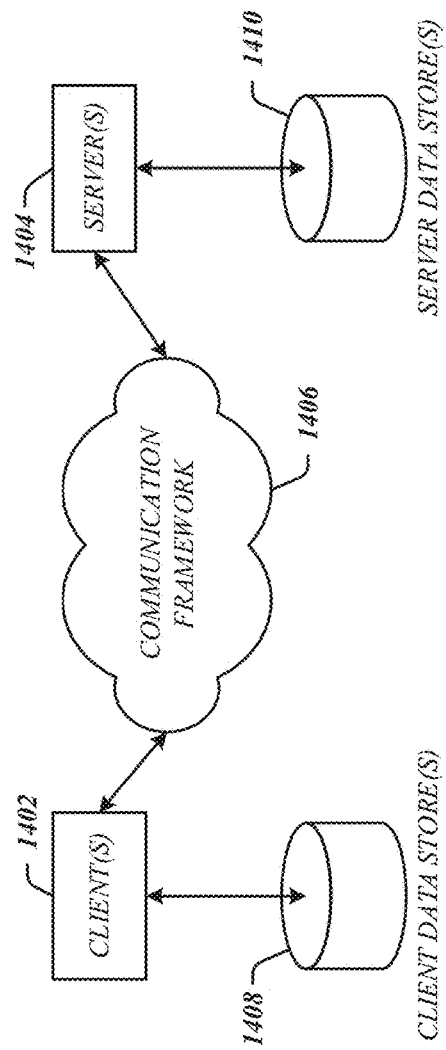
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 comprises includes one or more clients 1402 and servers 1404. The clients 1402 may implement a client device such as the mobile device 120 or the personal computer device 180. The servers 1404 may implement a server device such as the SNS service 210 or the messaging service 160. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1402 and the servers 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 15:
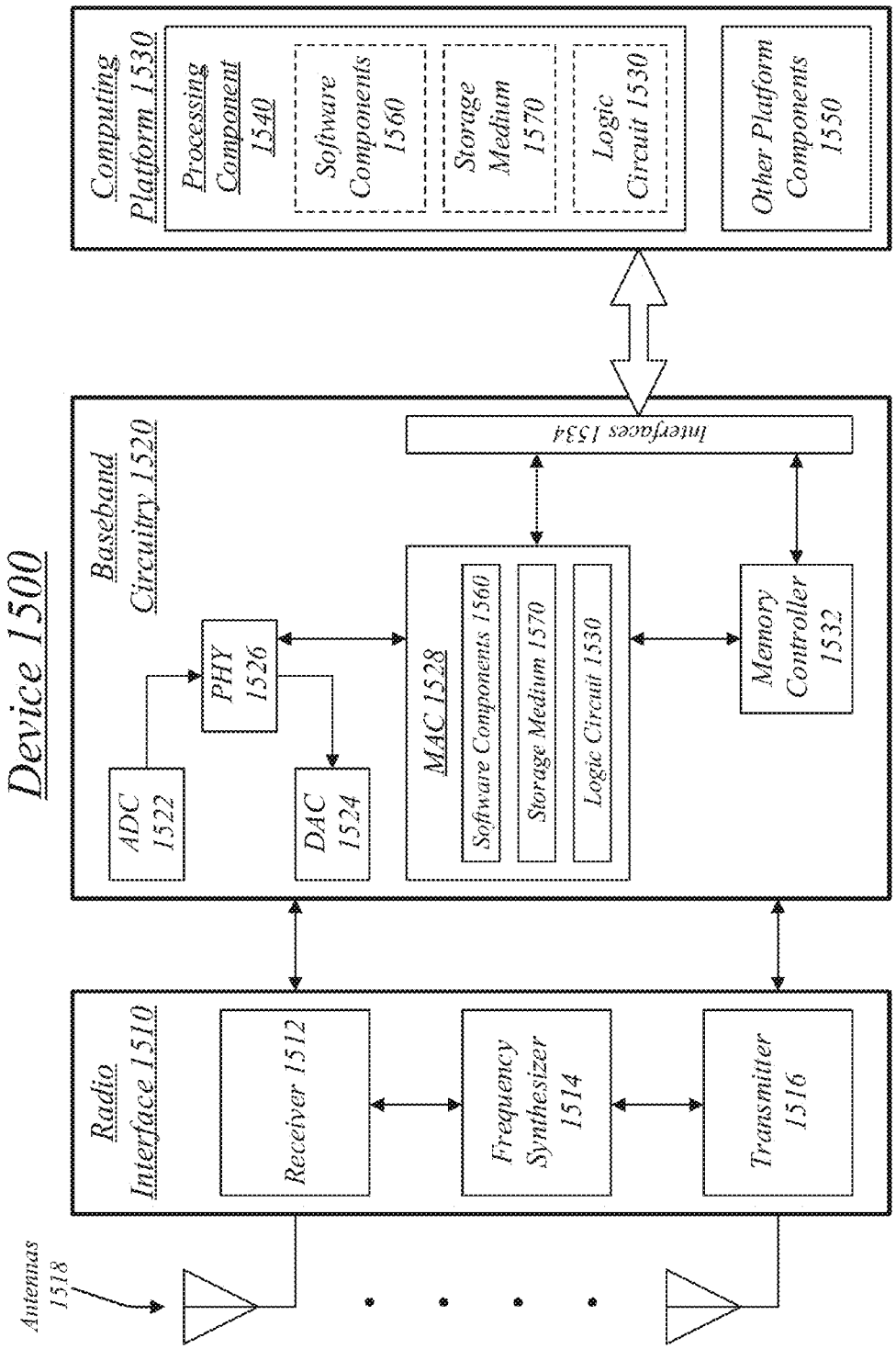
FIG. 15 illustrates an embodiment of a radio device architecture.

FIG. 15 illustrates an embodiment of a device 1500 for use in a multicarrier OFDM system, such as the messaging web access system 100. Device 1500 may implement, for example, software components 1560 as described with reference to messaging web access system 100 and/or a logic circuit 1530. The logic circuit 1530 may include physical circuits to perform operations described for the messaging web access system 100. As shown in FIG. 15, device 1500 may include a radio interface 1510, baseband circuitry 1520, and computing platform 1530, although embodiments are not limited to this configuration.

The device 1500 may implement some or all of the structure and/or operations for the messaging web access system 100 and/or logic circuit 1530 in a single computing entity, such as entirely within a single device. Alternatively, the device 1500 may distribute portions of the structure and/or operations for the messaging web access system 100 and/or logic circuit 1530 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1510 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1510 may include, for example, a receiver 1512, a transmitter 1516 and/or a frequency synthesizer 1514. Radio interface 1510 may include bias controls, a crystal oscillator and/or one or more antennas 1518. In another embodiment, radio interface 1510 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1520 may communicate with radio interface 1510 to process receive and/or transmit signals and may include, for example, an analog-to-digital converter 1522 for down converting received signals, a digital-to-analog converter 1524 for up converting signals for transmission. Further, baseband circuitry 1520 may include a baseband or physical layer (PHY) processing circuit 1556 for PHY link layer processing of respective receive/transmit signals. Baseband circuitry 1520 may include, for example, a processing circuit 1528 for medium access control (MAC)/data link layer processing. Baseband circuitry 1520 may include a memory controller 1532 for communicating with processing circuit 1528 and/or a computing platform 1530, for example, via one or more interfaces 1534.

In some embodiments, PHY processing circuit 1526 may include a frame construction and/or detection module, in combination with additional circuitry such as a buffer memory, to construct and/or deconstruct communication frames, such as radio frames. Alternatively or in addition, MAC processing circuit 1528 may share processing for certain of these functions or perform these processes independent of PHY processing circuit 1526. In some embodiments, MAC and PHY processing may be integrated into a single circuit.

The computing platform 1530 may provide computing functionality for the device 1500. As shown, the computing platform 1530 may include a processing component 1540. In addition to, or alternatively of, the baseband circuitry 1520, the device 1500 may execute processing operations or logic for the messaging web access system 100 and logic circuit 1530 using the processing component 1540. The processing component 1540 (and/or PHY 1526 and/or MAC 1528) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1530 may further include other platform components 1550. Other platform components 1550 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1500 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1500 described herein, may be included or omitted in various embodiments of device 1500, as suitably desired. In some embodiments, device 1500 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 1500 may be implemented using single input single output (SISO) architectures. However, certain implementations may include multiple antennas (e.g., antennas 1518) for transmission and/or reception using adaptive antenna techniques for beamforming or spatial division multiple access (SDMA) and/or using MIMO communication techniques.

The components and features of device 1500 may be implemented using any combination of discrete circuitry, application specific integrated circuits (ASICs), logic gates and/or single chip architectures. Further, the features of device 1500 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a request to load a web page at a messaging service website from a web browser executing on a client device, wherein the request includes a first session identifier for an open session between the web browser and a social network service for a user of the social network service; sending a second request to a server of the social network service for user information associated with the first session identifier; receiving the user information from the server of the social network service; rendering a login graphical user interface (UI) dialog, on the web page, the dialog comprising the user information and a selectable login UI element; receiving a control directive on the selectable login UI element; requesting message data associated with the user from a messaging service in response to receiving the control directive; receiving the requested message data; and transmitting the message data to the client device for presentation on the web browser.

A computer-implemented method may further comprise creating a second session identifier, wherein the second session identifier is usable by the web browser and by the messaging service to identify the user and locate message data of the user; and sending the second session identifier to the messaging service.

A computer-implemented method may further comprise receiving a second session identifier from the messaging service with the message data, wherein the second session identifier is usable by the web browser and by the messaging service to identify the user and locate message data of the user. The second session identifier may be usable to identify the user and locate message data after the user logs out of the social network service, or until the user logs out of the messaging service A computer-implemented method may further comprise presenting a profile image of the user and a user name in the login graphical UI dialog.

A computer-implemented method may further comprise receiving messages sent to the user, messages sent by the user, message status updates, or other updates to the status of a messaging conversation; and presenting messages sent to or sent by the user in a message interface in the web browser.

A computer-implemented method may further comprise presenting a message composing user interface in the web browser to receive control directives to address a message, generate a body of a message, and send a message.

An apparatus may comprise a processor circuit on a mobile device; and a messaging application operative on the processor circuit to receive a request from a remote web browser executing on a first device, the request to login to the messaging application and including a user identifier. The message application may comprise an access code generator to generate a first access code and to present the first access code to the user on a messaging application website at the remote web browser. The messaging application may comprise an authenticator to receive a second access code from a second device associated with the user identifier, compare the second access code to the first access code, and lookup an account associated with the user identifier and the second device. The messaging application may comprise a messaging component to retrieve message data for an account associated with the user identifier in response the second access code matching the first access code, and to transmit the message data to the remote web browser for presentation. The apparatus may be operative to implement any of the computer-implemented methods described herein.

The user identifier may be a mobile telephone number, an electronic mail address, or a user name associated with a mobile telephone number.

The access code generator may generate an alphanumeric text sequence, a machine-readable optical pattern, an audio signal, or a visual image.

The messaging component may retrieve messages sent to the user, messages sent by the user, message status updates, or other updates to the status of a messaging conversation, from a data store.

The messaging application may create a session identifier, wherein the session identifier is usable by the remote web browser and by the messaging application to identify the user and locate message data of the user, and to send the session identifier to the remote web browser. The session identifier may be useable to identify the user and locate message data until the user logs out of the messaging application.

The messaging application may receive a second request from the remote web browser to load a web page for the messaging application, the request including the session identifier; and the messaging component to retrieve message data associated with the session identifier.

At least one computer-readable storage medium may comprise instructions that, when executed, cause a system to receive a request from a remote web browser, the request to login to a messaging application and including a user identifier; generate a first access code; transmit the first access code to a messaging application installed on a mobile device associated with the user identifier; receive a second access code from the remote web browser; compare the second access code to the first access code; retrieve message data for an account associated with the user identifier when the second access code matches the first access code; and transmit the message data to the remote web browser for presentation.

The user identifier may be a mobile telephone number, an electronic mail address, or a user name associated with a mobile telephone number.

The instructions to generate the first access code may comprise instructions to generate an alphanumeric text sequence, a machine-readable optical pattern, an audio signal, or a visual image.

The instructions to retrieve message data may comprise instructions to retrieve messages sent to the user, messages sent by the user, message status updates, or other updates to the status of a messaging conversation, from a data store.

The computer-readable storage medium may comprise instructions to create a session identifier, wherein the session identifier is usable by the remote web browser and by the messaging application to identify the user and locate message data of the user, and to send the session identifier to the remote web browser. The session identifier may be useable to identify the user and locate message data until the user logs out of the messaging application.

The computer-readable storage medium may comprise instructions to receive a second request from the remote web browser to load a web page for the messaging application, the request including the session identifier; and retrieve message data associated with the session identifier.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving a request to load a web page at a messaging service server wherein the request includes a first session identifier for an open session between a web browser of a client device and a social network service server;
   sending a second request from the messaging service server to the social network service server for user information associated with the first session identifier;
   receiving the user information from the server of the social network service at the messaging service server;
   transmitting a login graphical user interface (UI) dialog from the messaging service server to the client device, the dialog comprising the user information and a selectable login UI element;
   retrieving message data associated with the user information in response to receiving a control directive on the selectable login UI element; and
   transmitting the retrieved message data to the client device for presentation on the web browser.

2. The method of claim 1, comprising:
   creating a second session identifier, wherein the second session identifier is usable by the web browser and by the messaging service to identify the user and locate message data of the user; and
   sending the second session identifier to the messaging service.

3. The method of claim 1, comprising:
   receiving a second session identifier from the messaging service with the message data, wherein the second session identifier is usable by the web browser and by the messaging service to identify the user and locate message data of the user.

4. The method of claim 1, further comprising: presenting a profile image of the user and a user name in the login graphical UI dialog.

5. The method of claim 1, comprising:
   prompting the user to log in to the social network service or to the messaging service when the session associated with the first session identifier is expired.

6. The method of claim 1, comprising:
   receiving messages sent to the user, messages sent by the user, message status updates, or other updates to the status of a messaging conversation; and
   presenting messages sent to or sent by the user in a message interface in the web browser.

7. The method of claim 1, comprising:
   presenting a message composing user interface in the web browser to receive control directives to address a message, generate a body of a message, and send a message.

8. A non-transitory computer-readable medium storing instructions that, when executed by a processor, causes the processor to:
   receive a request to load a web page at a messaging service server wherein the request includes a first session identifier for an open session between a web browser of a client device and a social network service server;
   send a second request from the messaging service server to the social network service server for user information associated with the first session identifier;
   receive the user information from the server of the social network service at the messaging service server;
   transmit a login graphical user interface (UI) dialog from the messaging service server to the client device, the dialog comprising the user information and a selectable login UI element;
   retrieve message data associated with the user information in response to receiving a control directive on the selectable login UI element; and
   transmit the retrieved message data to the client device for presentation on the web browser.

9. The medium of claim 8, further storing instructions for:
   creating a second session identifier, wherein the second session identifier is usable by the web browser and by the messaging service to identify the user and locate message data of the user; and
   sending the second session identifier to the messaging service.

10. The medium of claim 8, further storing instructions for:
    receiving a second session identifier from the messaging service with the message data, wherein the second session identifier is usable by the web browser and by the messaging service to identify the user and locate message data of the user.

11. The medium of claim 8, further storing instructions for:
    presenting a profile image of the user and a user name in the login graphical UI dialog.

12. The medium of claim 8, further storing instructions for:
    prompting the user to log in to the social network service or to the messaging service when the session associated with the first session identifier is expired.

13. The medium of claim 8, further storing instructions for:
    receiving messages sent to the user, messages sent by the user, message status updates, or other updates to the status of a messaging conversation; and
    presenting messages sent to or sent by the user in a message interface in the web browser.

14. The medium of claim 8, further storing instructions for:
    presenting a message composing user interface in the web browser to receive control directives to address a message, generate a body of a message, and send a message.

15. A system, comprising:
    a processor circuit; and
    a network interface, operable on the processor circuit, configured to:
        receive a request to load a web page at a messaging service server wherein the request includes a first session identifier for an open session between a web browser of a client device and a social network service server,
        send a second request from the messaging service server to the social network service server for user information associated with the first session identifier, receive the user information from the server of the social network service at the messaging service server, transmit a login graphical user interface (UI) dialog from the messaging service server to the client device, the dialog comprising the user information and a selectable login UI element, retrieve message data associated with the user information in response to receiving a control directive on the selectable login UI element, and transmit the retrieved message data to the client device for presentation on the web browser.

16. The system of claim 15, wherein the processor circuit is further configured to:

create a second session identifier, wherein the second session identifier is usable by the web browser and by the messaging service to identify the user and locate message data of the user; and send the second session identifier to the messaging service.

17. The system of claim 15, wherein the processor circuit is further configured to:

receive a second session identifier from the messaging service with the message data, wherein the second session identifier is usable by the web browser and by the messaging service to identify the user and locate message data of the user.

18. The system of claim 15, wherein the processor circuit is further configured to:

present a profile image of the user and a user name in the login graphical UI dialog.

19. The system of claim 15, wherein the processor circuit is further configured to:

prompt the user to log in to the social network service or to the messaging service when the session associated with the first session identifier is expired.

20. The system of claim 15, wherein the processor circuit is further configured to:

receive messages sent to the user, messages sent by the user, message status updates, or other updates to the status of a messaging conversation; and present messages sent to or sent by the user in a message interface in the web browser.

21. The system of claim 15, wherein the processor circuit is further configured to:

present a message composing user interface in the web browser to receive control directives to address a message, generate a body of a message, and send a message.

* * * * *